US011336353B2

(12) United States Patent
Nasiri Khormuji et al.

(10) Patent No.: US 11,336,353 B2
(45) Date of Patent: May 17, 2022

(54) DEVICES, METHODS AND COMPUTER PROGRAMS FOR WIRELESS COMMUNICATION WITH ROTATIONAL BEAM MANAGEMENT

(71) Applicant: Huawei Technologies Co., Ltd., Shenzhen (CN)

(72) Inventors: Majid Nasiri Khormuji, Kista (SE); Renaud-Alexandre Pitaval, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 78 days.

(21) Appl. No.: 16/567,800

(22) Filed: Sep. 11, 2019

(65) Prior Publication Data

US 2020/0007216 A1 Jan. 2, 2020

Related U.S. Application Data

(63) Continuation of application No. PCT/EP2017/083913, filed on Dec. 20, 2017.

(51) Int. Cl.
*H04W 72/04* (2009.01)
*H04B 7/06* (2006.01)
*H04W 72/08* (2009.01)

(52) U.S. Cl.
CPC ......... *H04B 7/0632* (2013.01); *H04B 7/0634* (2013.01); *H04W 72/046* (2013.01); *H04W 72/0446* (2013.01); *H04W 72/085* (2013.01)

(58) Field of Classification Search
CPC .. H04B 7/0632; H04B 7/0634; H04B 7/0695; H04B 7/0478; H04B 7/063; H04W 72/0446; H04W 72/046; H04W 72/085
See application file for complete search history.

(56) References Cited

U.S. PATENT DOCUMENTS

| 9,525,204 B2 * | 12/2016 | O'Keeffe | H01Q 3/2605 |
| 2013/0059619 A1 | 3/2013 | Kim et al. | |
| 2016/0127919 A1 * | 5/2016 | Hui | H04B 7/0617 342/371 |
| 2016/0198474 A1 | 7/2016 | Raghavan et al. | |

(Continued)

FOREIGN PATENT DOCUMENTS

| CN | 103596245 A | 2/2014 |
| CN | 106537804 A | 3/2017 |

(Continued)

OTHER PUBLICATIONS

Omar El Ayach et al., "Spatially Sparse Precoding in Millimeter Wave MIMO Systems," IEEE Transactions on Wireless Communications, vol. 13, No. 3, pp. 1499-1513, Institute of Electrical and Electronics Engineers, New York, New York (Mar. 2014).

(Continued)

*Primary Examiner* — Lan-Huong Truong
(74) *Attorney, Agent, or Firm* — Leydig, Voit & Mayer, Ltd.

(57) ABSTRACT

Devices, methods and computer programs for wireless communications with rotational beam management are disclosed. Information from past beam tracking stages can be used for a next beam tracking stage, since a next beam codebook to be used for beam scanning depends on an earlier beam codebook.

6 Claims, 16 Drawing Sheets

(56) References Cited

U.S. PATENT DOCUMENTS

2018/0279286 A1* 9/2018 Akoum ............. H04W 74/0833
2018/0358695 A1* 12/2018 Athley ................ H04B 7/0617
2019/0053072 A1* 2/2019 Kundargi ............. H04W 16/28

FOREIGN PATENT DOCUMENTS

| CN | 106817157 A | 6/2017 |
|---|---|---|
| CN | 106856611 A | 6/2017 |
| EP | 2817895 A1 | 12/2014 |
| WO | 2017196612 A1 | 11/2017 |

OTHER PUBLICATIONS

Seo et al., "Training Beam Sequence Design for Millimeter-Wave MIMO Systems: A POMDP Framework," IEEE Transactions on Signal Processing, vol. 64, No. 5, pp. 1228-1242, Institute of Electrical and Electronics Engineers, New York, New York (Mar. 1, 2016).

Noh et al., "Multi-Resolution Codebook Based Beamforming Sequence Design in Millimeter-Wave Systems," 2015 IEEE Global Communications Conference (GLOBECOM), pp. 1-6, Institute of Electrical and Electronics Engineers, New York, New York (2015).

"WF on Framework of Beam Management," 3GPP TSG RAN WG1 Meeting #88, Athens, Greece, R1-17xxxx (R1-1703523), pp. 1-4, 3rd Generation Partnership Project, Valbonne, France (Feb. 13-17, 2017).

"WF on RS for beam management," 3GPP TSG RAN WG1 Meeting #88, Athens, Greece, R1-1703558, pp. 1-3, 3rd Generation Partnership Project, Valbonne, France (Feb. 13-17, 2017).

"DL beam management," 3GPP TSG RAN WG1 Meeting #89, Hangzhou, China, R1-1708134, pp. 1-11, 3rd Generation Partnership Project, Valbonne, France (May 15-19, 2017).

"CSI framework considerations for beam management and time requirement," 3GPP TSG RAN WG1 Meeting #90 Prague, P.R. Czechia, R1-1713692, pp. 1-5, 3rd Generation Partnership Project, Valbonne, France (Aug. 21-25, 2017).

"3rd Generation Partnership Project; Technical Specification Group Radio Access Network; NR; Requirements for support of radio resource management (Release 15)," 3GPP TS 38.133 V1.0.0, pp. 1-38, 3rd Generation Partnership Project, Valbonne, France (Dec. 2017).

"3rd Generation Partnership Project; Technical Specification Group Radio Access Network; NR; Physical layer procedures for control (Release 15)," 3GPP TS 38.213 V2.0.0, pp. 1-56, 3rd Generation Partnership Project, Valbonne, France (Dec. 2017).

"RAN1 Chairman's Notes," 3GPP TSG RAN WG1 Meeting #88, Athens, Greece, pp. 1-109, 3rd Generation Partnership Project, Valbonne, France (Feb. 13-17, 2017).

Huawei, HiSilicon, "Discussion and evaluation on NR-SS multiplexing and bandwidth," 3GPP TSG RAN WG1 NR Ad Hoc Meeting, Spokane, USA, R1-1700033, total 12 pages, 3rd Generation Partnership Project, Valbonne, France (Jan. 16-20, 2017).

* cited by examiner

| The arrow indicates the direction of the beam selected based on the last beam scanning session and the associated feedback | The radioation pattern of the new beam codebook obtained by the rotation of the earlier beam codebook |

DEVICES, METHODS AND COMPUTER PROGRAMS FOR WIRELESS COMMUNICATION WITH ROTATIONAL BEAM MANAGEMENT

CROSS-REFERENCE TO RELATED APPLICATIONS

This application is a continuation of International Application No. PCT/EP2017/083913, filed on Dec. 20, 2017, the disclosure of which is hereby incorporated by reference in its entirety.

TECHNICAL FIELD

The disclosure relates to the field of wireless communications, and more particularly to a network node device, client device, and related methods and computer programs.

BACKGROUND

In some wireless systems, such as so called New Radio (NR) systems, a beam management procedure may be utilized. Generally, the network transmits e.g. a given reference signal for beam management, and then a user equipment detects the signal, performs measurements on it and sends feedback to the network based on the measurements.

Currently, NR systems support e.g. a two-stage beam management procedure. The first stage inludes procedure P1 which involves the use of wide or broad or coarse beams. The procedure P1 allows searching between network node device beams and client device beams such that a strong beam pair link (e.g. the pair that enables the highest channel quality index) can be identified.

The second stage may inlude procedures P2 and P3 which involve the use of narrow or refined beams. In other words, the procedure P2 and P3 allow beam refinement opportunities at network node device side and client device side, respectively. The beam refinement in P2/P3 is performed by utilizing beam reports from P1 results, as well as narrower beams than those used in P1 to leverage higher beamforming gains.

However, in current beam management procedures the beam tracking stages are repeated in each time interval in a way that ignores all the past information. This approach may result in lower link transmission rates due to not taking into account variations in links that are likely to correlate in time.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

It is an object of the disclosure to provide improved beam management in wireless communications. The foregoing and other objects are achieved by the features of the independent claims. Further implementation forms are apparent from the dependent claims, the description and the figures.

According to a first aspect, a network node device is provided. The network node device comprises a transceiver configured to transmit a current beam configuration for a beam scanning procedure. The current beam configuration comprises information on a set of beams in a current angular arrangement. The transceiver is further configured to receive feedback information related to the current beam configuration from a client device. The network node device further comprises a processor configured to determine a preferred beam of the set of beams in the current angular arrangement based on the received feedback information. The processor is further configured to determine a subsequent beam configuration for the beam scanning procedure. The subsequent beam configuration comprises information on one or more beams in a subsequent angular arrangement. A mean direction of the subsequent angular arrangement corresponds with the direction of the determined preferred beam. The transceiver is further configured to transmit the subsequent beam configuration. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining a wireless link to support a given quality of service (e.g. a link with a certain signal-to-noise ratio). The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In an implementation form of the first aspect, the current beam configuration includes an initial beam configuration comprising a set of beams in an initial angular arrangement. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the first aspect, the subsequent beam configuration has a higher angular resolution than the current beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the first aspect, the subsequent beam configuration has a narrower angular range than the current beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the first aspect, the received feedback information comprises at least one of: an indication of received power for at least one beam, an indication of channel quality for at least one beam, an indication of signal-to-noise ratio for at least one beam, an indication of signal-to-interference-plus-noise ratio for at least one beam, or an indication of block error ratio for at least one beam. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric (e.g. signal-to-noise ratio). The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the first aspect, the direction of the determined preferred beam of the current beam configuration corresponds with the direction of a longitudinal center axis of the determined preferred beam of the current beam configuration. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the first aspect, each beam configuration is defined by its respective beam management codebook. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the first aspect, the processor is further configured to utilize a linear transformation:

$$W_{subsequent}=R(\theta_i,\varphi_i)W_{current}$$

to determine a subsequent beam management codebook $W_{subsequent}$ by multiplying a matrix R with a current beam management codebook $W_{current}$, wherein the matrix R is determined by an elevation angle $\theta_i$ and an azimuth angle $\varphi_i$ obtained via the received feedback information. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used.

Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the first aspect, the transceiver is further configured to transmit a cell-specific reference signal for the initial beam configuration, and the transceiver is further configured to transmit a client device specific reference signal for the subsequent beam configuration. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the first aspect, the initial beam configuration is used in an initial beam management procedure, and a subsequent beam configuration is used in a subsequent beam management procedure, and the initial beam configuration comprises broader beams than any subsequent beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the first aspect, the reference signal comprises a synchronization signal in the initial beam management procedure. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the first aspect, the processor is further configured to adjust the period of the synchronization signal based on the feedback information related to the current beam configuration or link blockage probability. Since beamformed signals are highly directional, they may be prone to blockage from physical objects. Thus, periodically repeating the acquisition of coarse beams allows improved avoidance of link blockage.

In a further implementation form of the first aspect, in response to the transceiver receiving a first indication to start the initial beam management procedure from the client device, the processor is further configured to start the initial beam management procedure. The disclosure allows a dynamic way to avoid blockage such that a refined codebook is updated by the rotation based on the earlier feedback until the link quality measurements associated to the beams at the client device drop below a certain threshold value.

In a further implementation form of the first aspect, in response to the transceiver receiving a second indication to use a subsequent beam management procedure from the client device, the processor is further configured to start the subsequent beam management procedure. The disclosure allows a dynamic way to avoid blockage such that a refined codebook is updated by the rotation based on the earlier feedback until the link quality measurements associated to the beams at the client device drop below a certain threshold value.

According to a second aspect, a method is provided. The method comprises transmitting, by a network node device, a current beam configuration for a beam scanning procedure. The current beam configuration comprises information on a set of beams in a current angular arrangement. The method further comprises receiving, by the network node device, feedback information related to the current beam configuration from a client device. The method further comprises determining, by the network node device, a preferred beam of the set of beams in the current angular arrangement based on the received feedback information. The method further comprises determining, by the network node device, a subsequent beam configuration for the beam scanning procedure. The subsequent beam configuration comprises information on one or more beams in a subsequent angular arrangement, wherein a mean direction of the subsequent angular arrangement corresponds with the direction of the determined preferred beam. The method further comprises transmitting, by the network node device, the subsequent beam configuration. Information from past beam tracking stages can be used for a next beam tracking stage, since a next beam codebook to be used for the link tracking or beam scanning depends on an earlier beam codebook. This allows a higher rate link transmission because the time variation of the link is always taken into account, and less training overhead is used. Furthermore, the disclosure allows low pilot overhead and feedback overhead while still maintaining a wireless link to support a given quality of service (e.g. a link with a certain signal-to-noise ratio). The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In an implementation form of the second aspect, the current beam configuration includes an initial beam configuration comprising a set of beams in an initial angular arrangement. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the second aspect, the subsequent beam configuration has a higher angular resolution than the current beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the second aspect, the subsequent beam configuration has a narrower angular range than the current beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the second aspect, the received feedback information comprises at least one of: an indication of received power for at least one beam, an indication of channel quality for at least one beam, an indication of signal-to-noise ratio for at least one beam, an indication of signal-to-interference-plus-noise ratio for at least one beam, or an indication of block error ratio for at least one beam. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the second aspect, the direction of the determined preferred beam of the current beam configuration corresponds with the direction of a longitudinal center axis of the determined preferred beam of the current beam configuration. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the second aspect, each beam configuration is defined by its respective beam management codebook. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the second aspect, the method further comprises utilizing, by the processor, a linear transformation:

$$W_{subsequent} = R(\theta_i, \varphi_i) W_{current}$$

to determine a subsequent beam management codebook $W_{subsequent}$ by multiplying a matrix R with a current beam management codebook $W_{current}$, wherein the matrix R is determined by an elevation angle $\theta_i$ and an azimuth angle $\varphi_i$ obtained via the received feedback information. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the second aspect, the method further comprises transmitting, by the transceiver, a cell-specific reference signal for the initial beam configuration, and transmitting, by the transceiver, a client device specific reference signal for the subsequent beam configuration. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the second aspect, the initial beam configuration is used in an initial beam management procedure, and a subsequent beam configuration is used in a subsequent beam management procedure, and the initial beam configuration comprises broader beams than any subsequent beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

In a further implementation form of the second aspect, the reference signal comprises a synchronization signal in the initial beam management procedure. Information from past beam tracking stages can be used for a next beam tracking stage, since a next beam codebook to be used for the link tracking or beam scanning depends on an earlier beam codebook. The disclosure allows a higher rate link transmission because the time variation of the link is always taken into account, and less training overhead is used. Furthermore, the disclosure allows low pilot overhead and feedback overhead while still maintaining an effective channel quality metric, such as signal-to-noise ratio. The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

In a further implementation form of the second aspect, the method further comprises adjusting, by the processor, the period of the synchronization signal based on the feedback information related to the current beam configuration or link blockage probability. Since beamformed signals are highly directional, they may be prone to blockage from physical objects. Thus, periodically repeating the acquisition of coarse beams allows improved avoidance of link blockage.

In a further implementation form of the second aspect, the method further comprises starting, by the processor, the initial beam management procedure in response to receiving, by the transceiver, a first indication from the client device to start the initial beam management procedure. The disclosure allows a dynamic way to avoid blockage such that a refined codebook is updated by the rotation based on the earlier feedback until the link quality measurements associated to the beams at the client device drop below a certain threshold value.

In a further implementation form of the second aspect, the method further comprises starting, by the processor, the subsequent beam management procedure in response to receiving, by the transceiver, a second indication from the client device to use a subsequent beam management procedure. The disclosure allows a dynamic way to avoid blockage such that a refined codebook is updated by the rotation based on the earlier feedback until the link quality measurements associated to the beams at the client device drop below a certain threshold value.

According to a third aspect, a computer program is provided. The computer program comprises program code configured to perform the method according to the second aspect, when the computer program is executed on a computer. Information from past beam tracking stages can be used for a next beam tracking stage, since a next beam codebook to be used for the link tracking or beam scanning depends on an earlier beam codebook. This allows a higher rate link transmission because the time variation of the link is always taken into account, and less training overhead is used. Furthermore, the disclosure allows low pilot overhead and feedback overhead while still maintaining a wireless link to support a given quality of service (e.g. a link with a certain signal-to-noise ratio). The use of subsequent beam configurations in accordance with the disclosure allows enhanced link tracking in consecutive beam scanning sessions thereby providing higher beamforming gains to enhance the spectral efficiency of the transmission, which in turn allows an improved link budget.

According to a fourth aspect, a client device is provided. The client device comprises a transceiver configured to receive a current beam configuration for a beam scanning procedure. The current beam configuration comprises information on a set of beams in a current angular arrangement. The client device further comprises a processor configured to determine at least one link quality measurement to be performed on the set of beams in the current angular arrangement of the received current beam configuration. The processor is further configured to determine, based on the measured link quality exceeding or falling below a predetermined quality threshold, a first indication indicating an initial beam management procedure or a second indication indicating a subsequent beam management procedure. The transceiver is further configured to transmit the determined first indication or the second indication. The disclosure allows a dynamic way to avoid blockage such that a refined codebook is updated by the rotation based on the earlier feedback until the link quality measurements associated to the beams at the client device drop below a certain threshold value.

In an implementation form of the fourth aspect, the transceiver is further configured to transmit the first indication to start the initial beam management procedure in response to the measured link quality being below a predetermined quality threshold. The disclosure allows a dynamic way to avoid blockage such that a refined codebook is updated by the rotation based on the earlier feedback until the link quality measurements associated to the beams at the client device drop below a certain threshold value.

In a further implementation form of the fourth aspect, the transceiver is further configured to transmit the second indication to start the subsequent beam management procedure in response to the measured link quality exceeding a predetermined quality threshold. The disclosure allows a dynamic way to avoid blockage such that a refined codebook is updated by the rotation based on the earlier feedback until the link quality measurements associated to the beams at the client device drop below a certain threshold value.

In a further implementation form of the fourth aspect, an initial beam configuration is used in the initial beam management procedure, and a subsequent beam configuration is used in the subsequent beam management procedure, and the initial beam configuration comprises broader beams than any subsequent beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

According to a fifth aspect, a method is provided. The method comprises receiving, at a client device, a current beam configuration for a beam scanning procedure. The current beam configuration comprises information on a set of beams in a current angular arrangement. The method further comprises determining, by the client device, at least one link quality measurement to be performed on the set of beams in the current angular arrangement of the received current beam configuration. The method further comprises determining, based on the measured link quality exceeding or falling below a predetermined quality threshold, a first indication indicating an initial beam management procedure or a second indication indicating a subsequent beam management procedure. The method further comprises transmitting, by the client device, the determined first indication or the second indication. The disclosure allows a dynamic way to avoid blockage such that a refined codebook is updated by the rotation based on the earlier feedback until the link quality measurements associated to the beams at the client device drop below a certain threshold value.

In an implementation form of the fifth aspect, the method further comprises transmitting, by the transceiver, the first indication to start the initial beam management procedure in response to the measured link quality being below a predetermined quality threshold. The disclosure allows a dynamic way to avoid blockage such that a refined codebook is updated by the rotation based on the earlier feedback until the link quality measurements associated to the beams at the client device drop below a certain threshold value.

In a further implementation form of the fifth aspect, the method further comprises transmitting, by the transceiver, the second indication to start the subsequent beam management procedure in response to the measured link quality exceeding a predetermined quality threshold. The disclosure allows a dynamic way to avoid blockage such that a refined codebook is updated by the rotation based on the earlier feedback until the link quality measurements associated to the beams at the client device drop below a certain threshold value.

In a further implementation form of the fifth aspect, an initial beam configuration is used in the initial beam management procedure, and a subsequent beam configuration is used in the subsequent beam management procedure, and the initial beam configuration comprises broader beams than any subsequent beam configuration. Using a coarse beam configuration only initially allows reducing overhead thus improving spectral efficiency of the transmission. At the same time, use of limited number of beams in subsequent stages reduces both the pilot overhead and the feedback overhead. The pilot overhead reduction enhances spectral efficiency of the forward link (e.g. downlink) and the feedback overhead reduction improves the spectral efficiency of the reverse link (e.g. uplink).

According to a sixth aspect, a computer program is provided. The computer program comprises program code configured to perform the method according to the fifth aspect, when the computer program is executed on a computer. The disclosure allows a dynamic way to avoid blockage such that a refined codebook is updated by the rotation based on the earlier feedback until the link quality measurements associated to the beams at the client device drop below a certain threshold value.

Many of the attendant features will be more readily appreciated as they become better understood by reference to the following detailed description considered in connection with the accompanying drawings.

DESCRIPTION OF THE DRAWINGS

In the following, example embodiments are described in more detail with reference to the attached figures and drawings, in which.

In the following, identical reference signs refer to identical or at least functionally equivalent features.

DETAILED DESCRIPTION

In the following description, reference is made to the accompanying drawings, which form part of the disclosure, and in which are shown, by way of illustration, specific aspects in which the embodiments of the present invention may be placed. It is understood that other aspects may be utilized and structural or logical changes may be made without departing from the scope of the embodiments of the present invention. The following detailed description, therefore, is not to be taken in a limiting sense, as the scope of the embodiments of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Beam scanning (also known as link tracking) refers to a technique in which e.g. a set of reference symbols or pilot signals are mapped to certain beam patterns by changing beamforming weights at transmit antennas, such that the generated signal is radiated in a desirable direction (i.e. the beam pattern), so as to then obtain a desirable transmit direction via feedback. A set of beamforming weights may be referred to as a beam codebook with which a set of beams can be generated by beamforming of the reference signals.

Figure 2A:
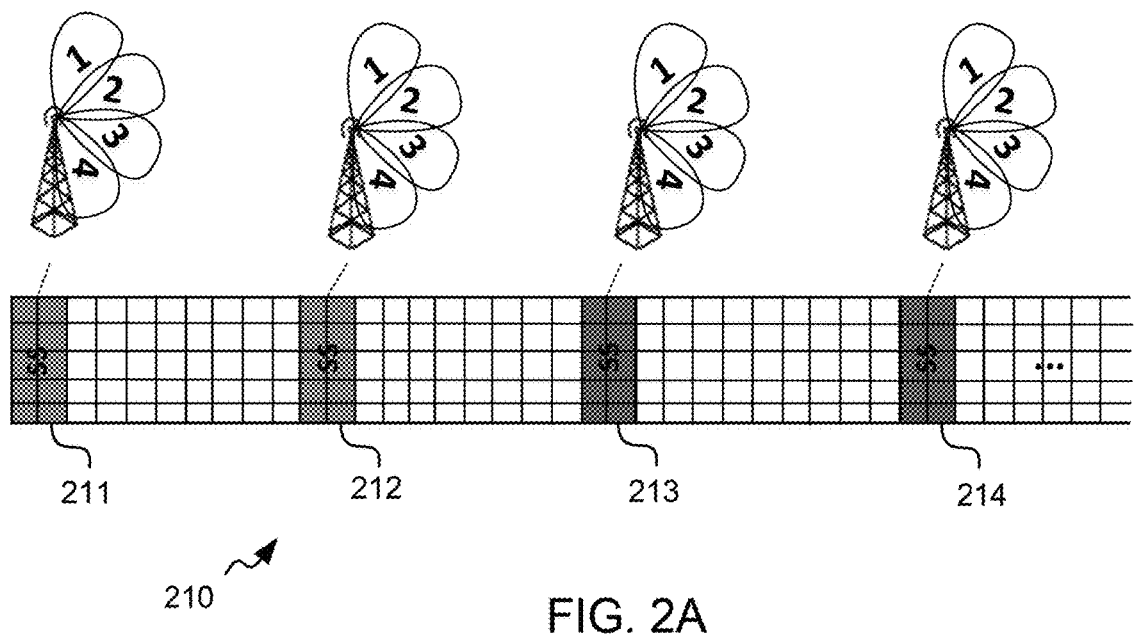
FIG. 2A is a diagram illustrating single-stage link tracking.

In the following, a general description of link tracking is provided based on FIGS. 2A and 2B. FIG. 2A illustrates an example of single-stage link tracking, and FIG. 2B illustrates an example of two-stage link tracking.

Acquisition of broad or coarse beams can be performed with synchronization signals (SS). Diagram 210 of FIG. 2A illustrates single-stage link tracking with fixed coarse beam codebooks with periodic synchronization signals 211-214 used for link acquisition. Generally, the aim is to divide the range of angles uniformly and to construct beams the main lobes of which are located at uniformly selected angles in a given range. Usually, it is also desirable to optimize the width of the main lobe such that the set of beams cover a range of angles to avoid outage. Assuming the channel's response is highly directional with angles of departure (AoD) ranging from $\phi_{min}$ to $\phi_{max}$ (in other words, any transmission outside of this range is considered to be too attenuated to be detectable by the receiver), this range is divided into multiple angular sub-ranges. The parameters $\phi_{min}$ and $\phi_{max}$ may also be decided a priori in some cases, for example in a sectorized cellular system for which only certain angles are covered in each sector. Otherwise, without any prior information, the parameters can e.g. be set such that $\phi_{min}=0$ to $\phi_{max}=\pi$ to avoid an outage event in the transmission. Diagram 210 of FIG. 2A shows an example with four beams which can be transmitted using e.g. time-division multiplexing (TDM), frequency-division multiplexing (FDM) or code-division multiplexing (CDM). For CDM, mutually orthogonal covering codes (OCC) may also be used.

Broad beams have a small beamforming gain since the beams are designed to cover a wider angular range. One way to mitigate the small beamforming gain is to refine the link with a two-resolution (also known as two-stage) beam codebook, such that in the first stage a coarser and broader angular direction is determined and in the second phase a finer narrow beam direction is found. Diagram 220 of FIG. 2B illustrates the two-stage link tracking in which the first stage 221 uses four broad beams and the second stage 222 uses four narrow beams for each broad beam (i.e. sixteen narrow beams in total). In the second stage 222, based on the feedback from the receiver after the first stage 221, the transmitter sends the four beams in the direction of the selected broad beams by which the final selection of the narrow beam is accomplished.

Figure 2B:
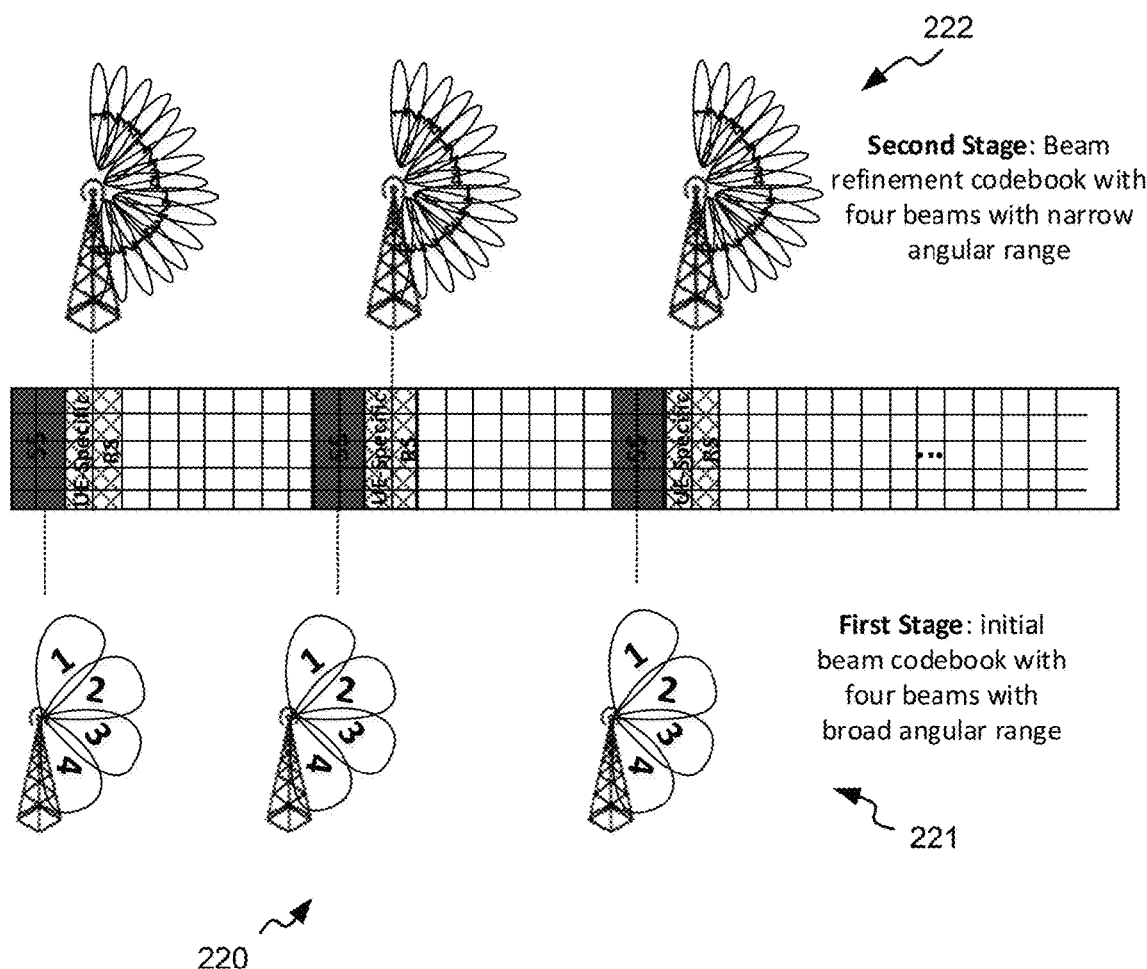
FIG. 2B is a diagram illustrating two-stage link tracking.
Figure 3:
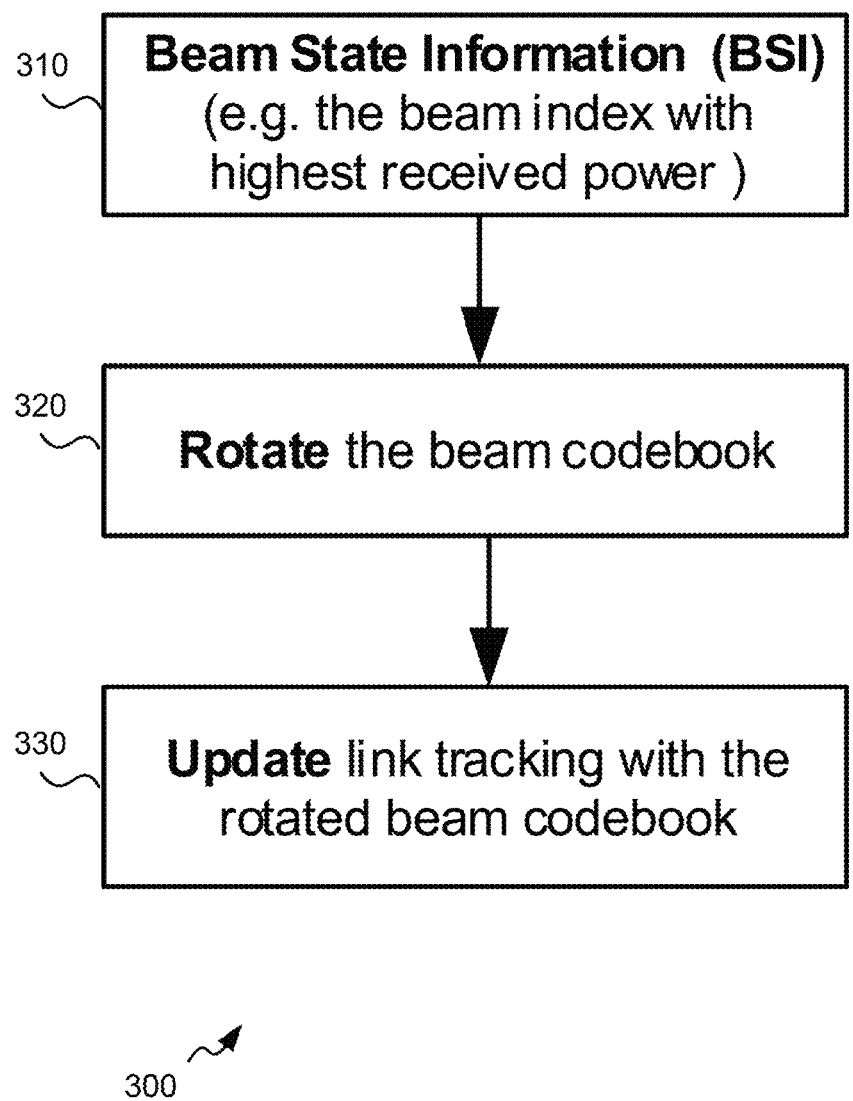
FIG. 3 is a flow diagram illustrating a method.

However, there are issues with the approaches of FIGS. 2A to 2B. For example, in the approach illustrated in FIG. 2A, due to the limited number of beams, the beams are designed as broad as possible to avoid an outage event (i.e. to cover a wide angular range). This reduces the effective signal-to-noise ratio (SNR) of the link, which reduces power efficiency which in turn reduces spectral efficiency. Furthermore, the beam tracking stages are simply repeated in each time interval, thus ignoring all past information. Such an approach is not optimal because variations in the links are likely to correlate in time.

The approach illustrated in FIG. 2B uses finer or narrower beams in the second stage 222. However, this effectively means that a higher number of beams are used which increases the pilot overhead and feedback overhead. Additionally, the beam tracking stages are still repeated every other time interval, thus again ignoring all past information. Again, such an approach is not optimal because variations in the links are likely to correlate in time.

The disclosure allows beam management for the purpose of beam scanning e.g. in millimeter wave (mmW) radio channels, such that information of past beam scanning stages can be used for a next beam scanning stage. In other words, a next beam codebook used at the transmitter for the beam scanning depends on an earlier beam codebook in all beam scanning instants. This provides a higher link transmission rate because the time variation of the link is always taken into consideration, and less training overhead is used. Furthermore, the disclosure allows low pilot and feedback overhead yet also an effective SNR.

In the following, example embodiments of network node device 100 and client device 110 are described based on FIGS. 1A and 1B. Some of the features of the described devices are optional features which provide further advantages. Furthermore, functionalities of the network node device 100 and the client device 110 according to embodiments of the embodiments of the present invention will be described later in more detail in the following descriptions of FIG. 3 to FIG. 16.

Figure 1A:
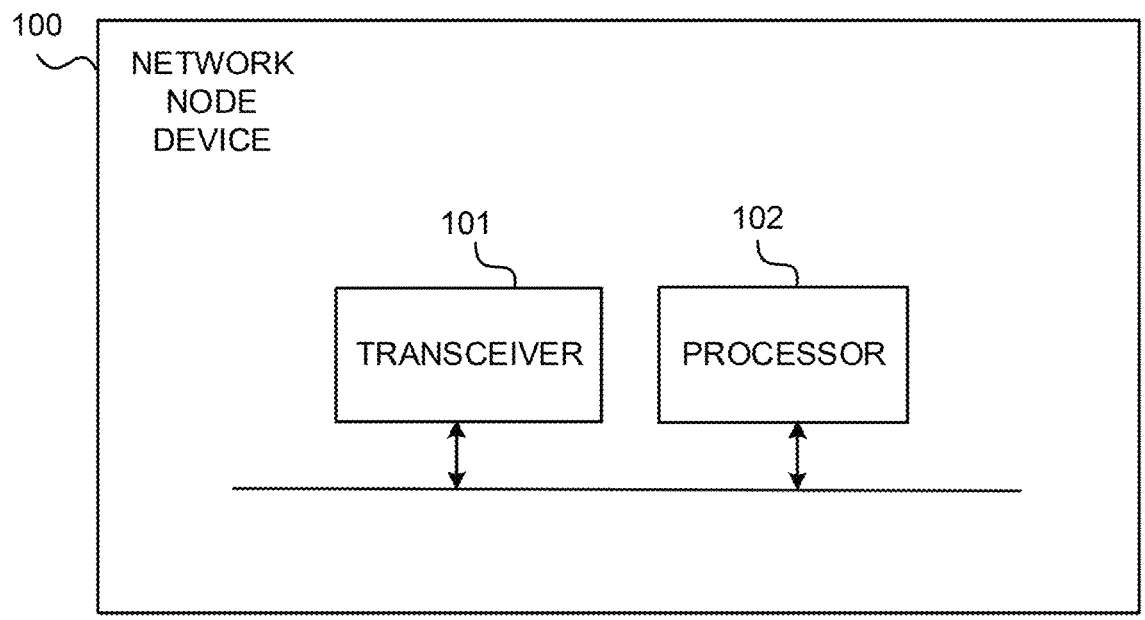
FIG. 1A is a block diagram illustrating a network node device.

FIG. 1A is a block diagram that illustrates a network node device 100. The network node device 100 may include e.g. a base station, such as a macro-eNodeB, a pico-eNodeB, a home eNodeB, a fifth-generation base station (gNB) or any such device providing an air inter-face for client devices (including e.g. the client device 110 of FIG. 1B) to connect to the wireless network via wireless transmissions.

According to an aspect, the network node device 100 comprises a transceiver 101 and a processor or a processing unit 102 coupled to the transceiver 101, which may be used to implement the functionalities described later in more detail.

The processor 102 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The network node device 100 may further comprise a memory (not illustrated in FIG. 1A) that is configured to store e.g. computer programs and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

The transceiver 101 is configured to transmit a current beam configuration for a beam scanning procedure. Herein, an "initial" beam configuration refers to a beam configuration that is used first or initially in the beam scanning procedure without any prior information, or to a beam configuration that is used first or initially in the beam scanning procedure by request after a link blockage. A "current" beam configuration refers to a beam configuration that is used currently in the beam scanning procedure, and a "subsequent" beam configuration refers to a beam configuration that is used subsequently (i.e. after the "current") in the beam scanning procedure. Thus, a current beam configuration may also be the initial beam configuration, if the initial beam configuration is the one that is currently being used. The initial beam configuration may use only coarse beams.

Further, each beam configuration comprises information on a set of beams in a respective angular arrangement. Thus, an initial beam configuration comprises information on a set of beams in an initial angular arrangement, a current beam configuration comprises information on a set of beams in a current angular arrangement, and a subsequent beam configuration comprises information on a set of beams in a subsequent angular arrangement.

An angular arrangement may comprise e.g. an angular range of the respective set of beams and/or an angular resolution of the respective set of beams. The angular resolution indicates the resolution of beams on given angular range, thus depending on how many beams are used to cover the given angular range. In an example, a subsequent beam configuration may have a narrower angular range than a current beam configuration. For example, the current beam configuration may have an angular range of 180 degrees while the subsequent beam configuration may have an angular range of 45 degrees. In a further example, a subsequent beam configuration may have a higher angular resolution than a current beam configuration. For example, the current beam configuration may utilize two broad beams to cover an angular range of 45 degrees while the subsequent beam configuration may utilize four narrow beams to cover the same angular range of 45 degrees.

In an example, the initial beam configuration may be used in an initial beam management procedure, such as the beam management procedure P1 of a new radio (NR) system. A subsequent beam configuration may be used in a subsequent beam management procedure, such as the beam management procedure P2 or P3 of the NR system. Furthermore, the initial beam configuration may comprise broader or more coarse beams than any subsequent beam configuration.

In an example, the transceiver 101 may be further configured to transmit a cell-specific reference signal (RS) for the initial beam configuration, and a client device specific reference signal for any subsequent beam configuration. Furthermore, in the initial beam management procedure the reference signal may comprise a synchronization signal (SS).

Figure 1B:
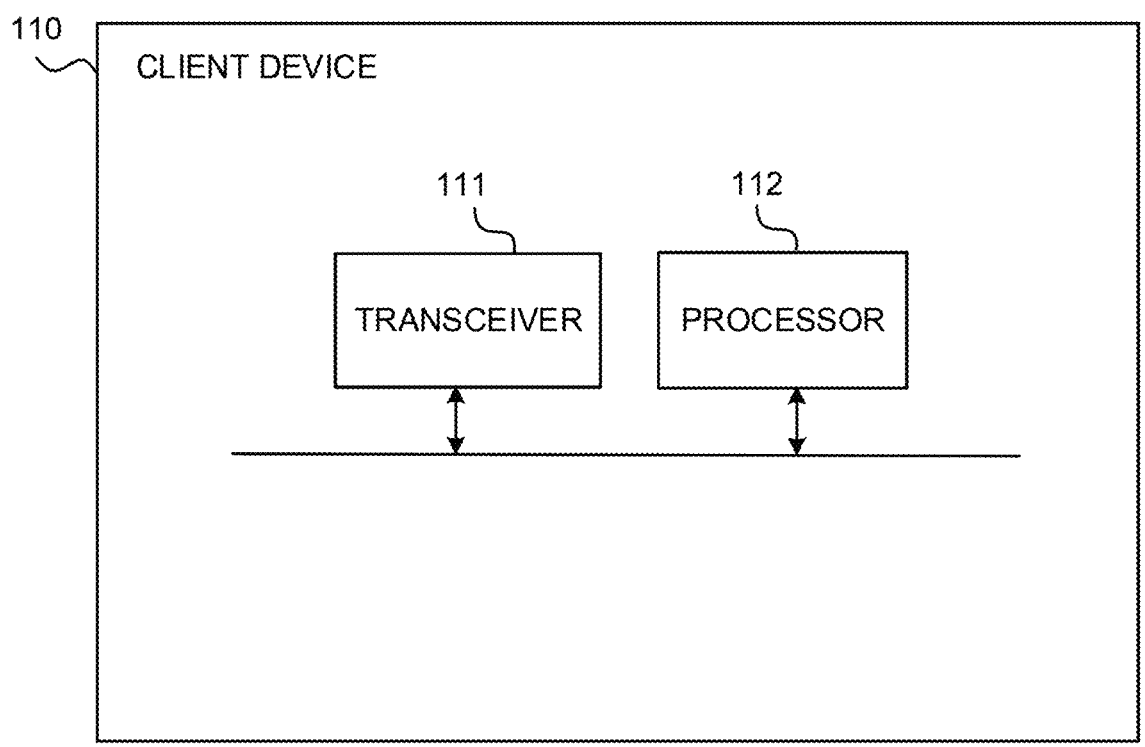
FIG. 1B is a block diagram illustrating a client device.

The transceiver 101 is further configured to receive feedback information related to the current beam configuration from a client device, such as the client device 110 of FIG. 1B. In an example, the received feedback information may comprises an indication of received power for at least one beam, an indication of channel quality for at least one beam, an indication of signal-to-noise ratio (SNR) for at least one beam, an indication of signal-to-interference-plus-noise ratio (SINR) for at least one beam, and/or an indication of block error ratio (BLER) for at least one beam.

The processor 102 is configured to determine a preferred beam of the set of beams in the current angular arrangement based on the received feedback information. The preferred beam may comprise e.g. the beam with the highest received power, as indicated by the feedback information received from the client device. In an example, the feedback information may comprise beam state information (BSI), and the BSI may in turn comprise a beam index (BI) of the preferred beam.

The processor 102 is further configured to determine a subsequent beam configuration for the beam scanning procedure, such that a mean direction of the subsequent angular arrangement corresponds with the direction of the determined preferred beam (e.g. the axis that lies on the center of the main lobe of the selected beams). The mean direction of the preferred beam may be obtained e.g. via averaging calculations, or via any other suitable calculations. In an example, the direction of the preferred beam of the current beam configuration corresponds or coincides with the direction of a longitudinal center axis of the determined preferred beam of the current beam configuration.

In an example, each beam configuration is defined by its respective beam management codebook. In other words, the current beam configuration may be defined by a current beam management codebook, and the subsequent beam configuration may be defined by a subsequent beam management codebook. Herein, a codebook indicates a set of beams represented as beamforming weights.

In an example, the processor 102 is further configured to utilize a linear transformation:

$$W_{subsequent}=R(\theta_i,\varphi_i)W_{current}$$

to determine a subsequent beam management codebook $W_{subsequent}$ by multiplying a matrix R with a current beam management codebook $W_{current}$, wherein the matrix R is determined by an elevation angle $\theta_i$ and an azimuth angle $\varphi_i$ obtained via the received feedback information.

The transceiver 101 is further configured to transmit the subsequent beam configuration. Further, the transceiver 101 may be configured to transmit the subsequent beam configuration to a client device, such as the client device 110 of FIG. 1B.

In an example, the processor 102 is configured to adjust the period of the synchronization signal based on the feedback information related to the current beam configuration or link blockage probability. The adjustment of the period of the synchronization signal and examples of its use are further described below in connection with the client device 110 of FIG. 1B.

In an example, in response to the transceiver 101 receiving a first indication to start the initial beam management procedure from the client device (such as the client device 110 of FIG. 1B), the processor 102 is further configured to start the initial beam management procedure. In another example, in response to the transceiver 101 receiving a second indication to use a subsequent beam management procedure from the client device (such as the client device 110 of FIG. 1B), the processor 102 is further configured to start the subsequent beam management procedure. The first and second indication and examples of their use are further described below in connection with the client device 110 of FIG. 1B.

In other words, the disclosure allows constructing beam codebooks (such as a set of beams which may be represented as beamforming weights) to be used in the link tracking or beam scanning from a served cell. This is illustrated by flow diagram 300 of FIG. 3. The beam scanning comprises an initial step and follow-up steps. In the first initial step, a coarse beam scanning with beams that cover a broad angular range is performed. The follow-up steps are then performed to refine the beam tracking by using a refined codebook which covers a narrower angular range. To enable the link tracking, the receiver may report Beam State Information (BSI) to the transmitter at each step, step 310. BSI, in an example, may contain the beam index (BI) of the beam with the highest receiver power. The refinement codebook at each step may be rotated in the angle of departure (AoD) domain such that the new refinement codebook has a radiation pattern which is centered on the main direction of the latest beam fed back from the receiver to enable an enhanced tracking in the next scanning session, step 320. Then the rotated refined beam codebook is further used for link tracking in the subsequent link tracking sessions. The rotation of the beam codebooks may be updated similarly for the next beam scanning sessions based on the last BSI obtained from the receiver via a feedback link, step 330.

Figure 4:
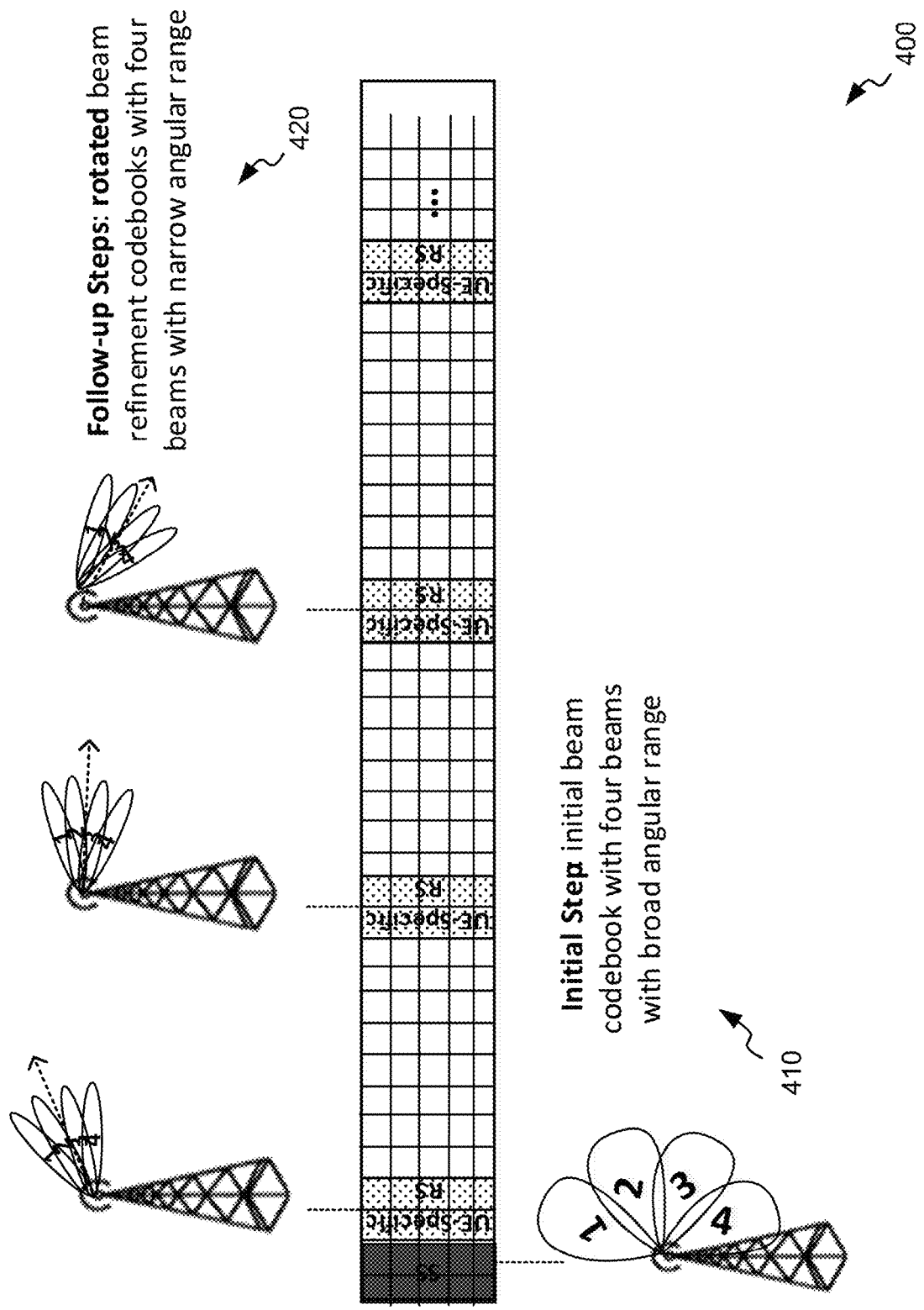
FIG. 4 is a diagram illustrating a transmission frame.

FIG. 4 further illustrates an example of a transmission frame with an initial beam codebook and subsequent rotated beam refinement codebooks. That is, the first step 410 uses an initial coarse beam codebook and the remaining follow-up steps 420 employ rotated beam refinement codebooks. In the example of FIG. 4, the initial coarse beam is used only once, which reduces the overhead thus improving the spectral efficiency of the transmission. Further in the example of FIG. 4, a mechanism referred to as a rotated beam codebook is used to enable enhanced link tracking in consecutive scanning sessions to provide higher beamforming gains to enhance the spectral efficiency of the transmission. Further in the example of FIG. 4, the follow-up steps use a limited number of beams. This reduces both the pilot overhead and the feedback overhead. The pilot reduction enhances spectral efficiency of the forward link (e.g. downlink) and the feedback overhead reduction improves the spectral efficiency of the reverse link (e.g. uplink).

Figure 5A:
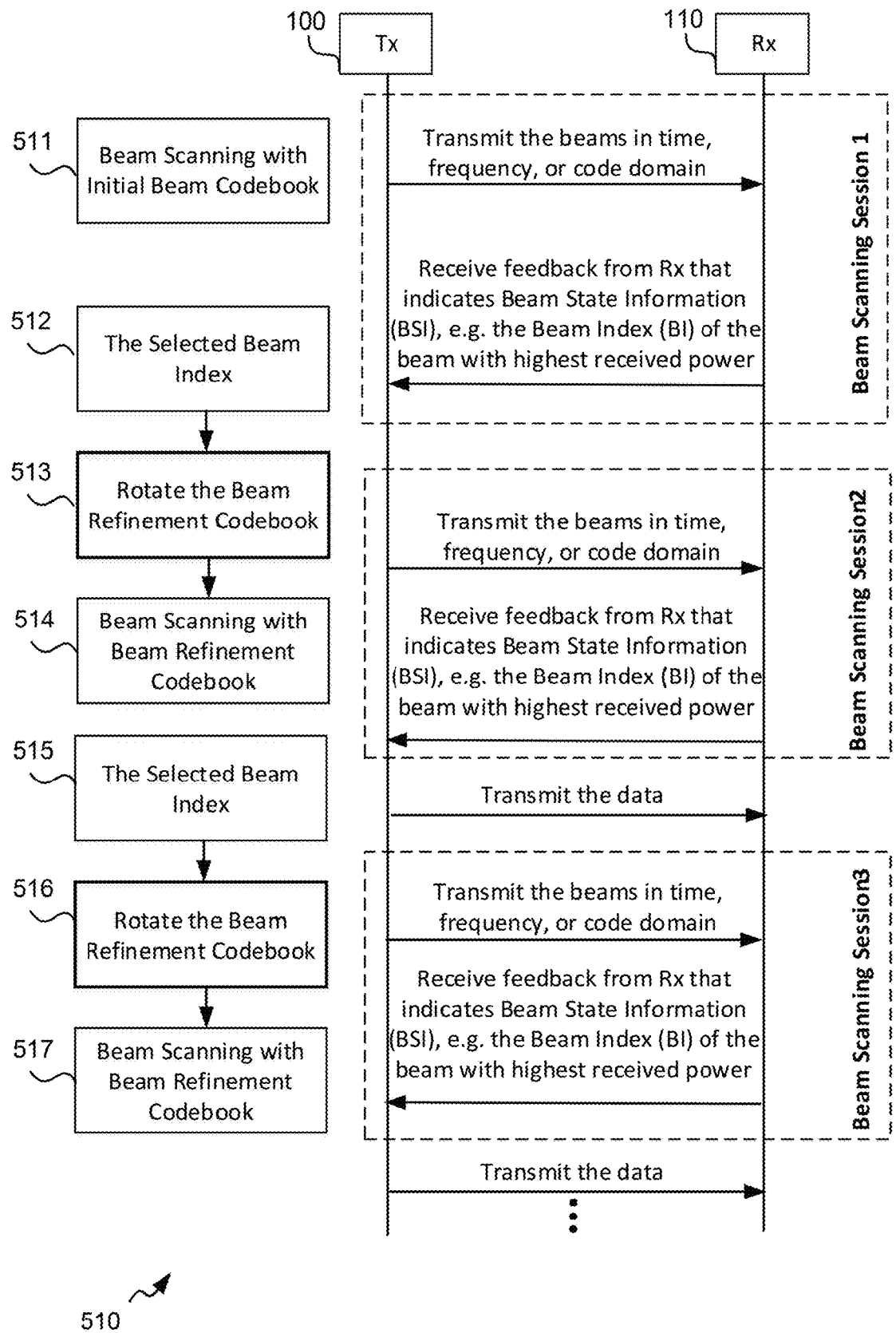
FIG. 5A is a diagram illustrating signaling operations.
Figure 5B:
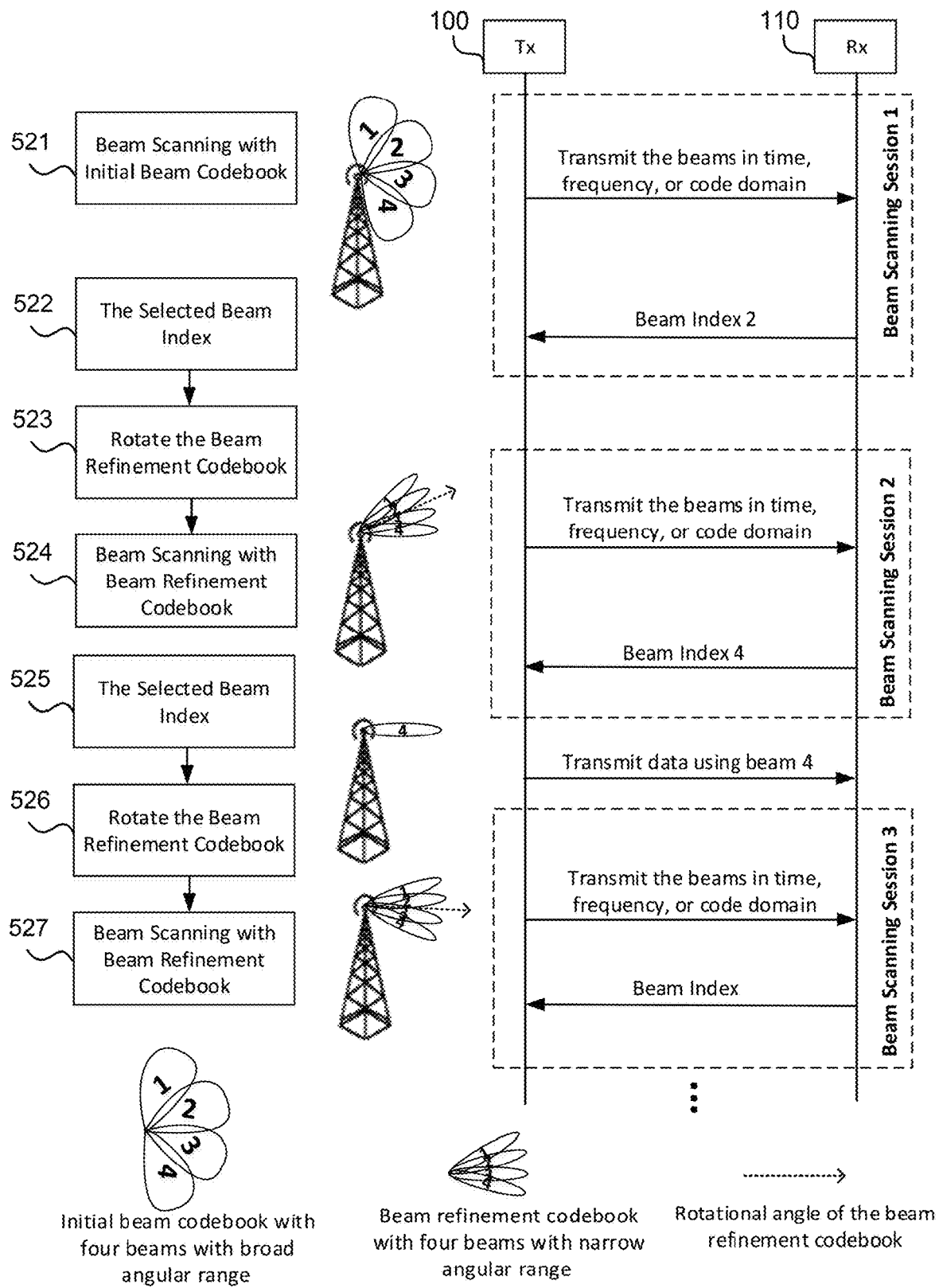
FIG. 5B is another diagram illustrating signaling operations.
Figure 6:
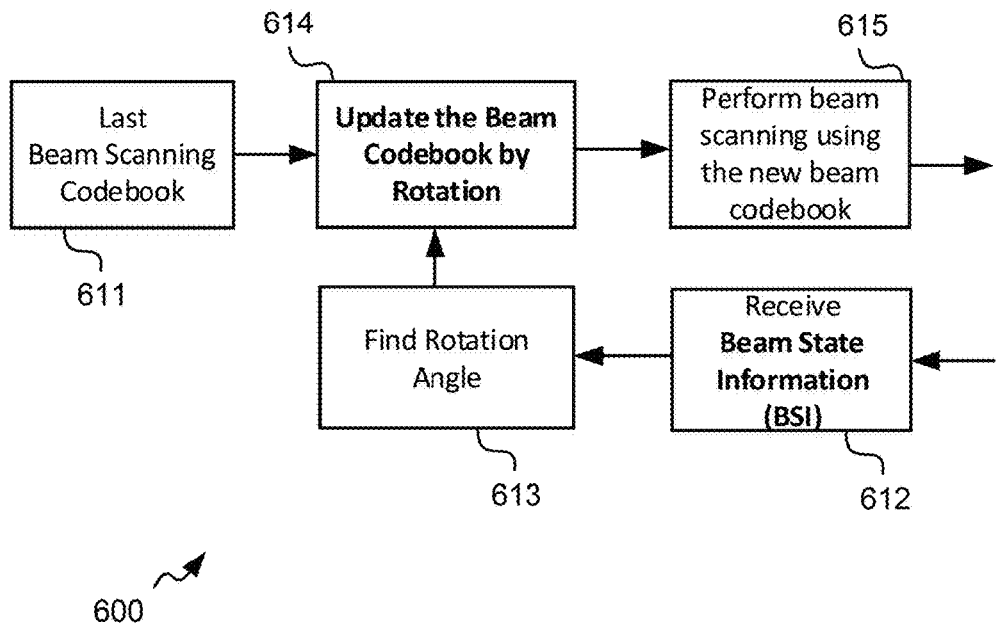
FIG. 6 is a diagram illustrating beam codebook adaptation.

FIGS. 5A and 5B further illustrate signaling operations with three beam scanning sessions. Diagram 510 of FIG. 5A illustrates a general case and diagram 520 of FIG. 5B illustrates a case with example beam codebooks in the three beam scanning sessions. Diagram 600 of FIG. 6 further illustrates these examples. Step 511 corresponds with step 521, step 512 corresponds with step 522, step 513 corresponds with step 523, step 514 corresponds with step 524, step 515 corresponds with step 525, step 516 corresponds with step 526, and step 517 corresponds with step 527.

At steps 511 and 521, the transmitter Tx of the transceiver 101 at the network node device 100 employs an initial beam codebook for beam scanning (and a last beam codebook in step 611). Beam scanning means that some reference symbols or pilot signals are mapped to certain beam patterns by changing the beamforming weights at the transmit antennas such that the generated signal is radiated in a desirable direction (i.e., the beam pattern). The network node device 100 may be e.g. an access node or a base station. In the absence of any prior angular information, the initial beam codebook may be uniform in the angular domain to cover all angles in order to minimize the outage performance. One way to minimize the scanning overhead due to the reference signals at the transmitter Tx and the feedback overhead from the receiver Rx is to let the network node device 100 use a coarse beam codebook at steps 511 and 521. This reduces the number of beams required to be transmitted and hence decreases the training overhead. The network node device 100 may transmit the reference symbols (i.e. pilot signals) over the beams in time, frequency or code domain, or in a combination thereof.

Step 521 of FIG. 5B uses an initial beam codebook with four beams which cover nearly 180 degrees. That is, each beam covers essentially 45 degrees. At least four time-frequency-code resources are needed to transmit the beams which can be done with e.g. Time-Division Multiplexing (TDM), Frequency-Division Multiplexing (FDM) or Code-Division Multiplexing (CDM). For CDM, mutually Orthogonal Covering Codes (OCCs) may be used as well.

At steps 512, 522 and 612, the receiver Rx (e.g. transceiver 111 of client device 110) sends back Beam State Information (BSI) via a feedback link which may indicate a measure of the channel quality for a subset of beams. In an example, the BSI reports the index of the most suitable beam, such as the beam with the highest received power, highest Channel Quality Index (CQI), SNR, SINR, or lowest BLER. In the example of FIG. 5B, two bits of feedback from the receiver Rx to the network node device 100 are used to inform the transmitter Tx of the network node device 100 about the index of the most suitable beam for subsequent data transmission from the network node device 100 to the receiver Rx of the client device 110, step 522. The beam selection may be based e.g. on the highest received power, highest Channel Quality Index (CQI), SNR, SINR, or lowest BLER. Another approach is to use compressive methods, based on e.g. differential reporting to reduce the overhead or regrouping of the beams.

Starting from steps 514, 524 and 615, a beam refinement codebook will be used to further enhance the beam scanning quality to provide the links with higher beamforming gain to support higher rate transmission. FIG. 5B uses an example of beam refinement codebook with four beams that together cover nearly 45 degrees. The beam refinement codebook can be constructed by dividing an angle range of a single beam of the coarse beam codebook into multiple beams. The number of the beams can be configured based on the desirable quality in link tracking and the available resources for the training overhead.

The example below provides a method to transform a codebook with a given radiation pattern to a new codebook with a rotated radiation pattern in the AoD domain in steps 513, 523 and 613-614. This allows updating the beam codebook in each beam scanning session based on the last BSI feedback from the receiver Rx to the transmitter Tx to better utilize and adapt to the time correlation in the network, which eventually enhances link budget and network capacity.

The beam scanning in session i is performed with beam codebook $W_i$. Here, the beam refinement codebook used at time interval i is denoted as $$W_i = [w_{i1} w_{i2} w_{i3} \ldots w_{ik_i}] \quad (1)$$

where $k_i$ denotes the number of beams used in the beam scanning session i (i.e., the time interval during which the beam scanning session is accomplished), and the vector $w_{ij}$, for $1 \leq j \leq k_i$, denotes the beamforming weights used to generate beam j in the beam scanning session i. The receiver Rx sends feedback in Beam State Information (BSI). In this example, the BSI contains the Beam Index (BI) of the beam with the highest receiver power (that is, Beam Reference Signal Received Power (BRSRP)). The index of the beam with the highest BRSRP in the time interval i is denoted as $l_i$ where $1 \leq l_i \leq k_i$. The transmitter Tx, using the received beam index with the highest BRSRP, finds the center of elevation angular range of beam $w_{l_i}$, denoted as $\theta_i$ ($w_{l_i}$), and rotates codebook i to form a new beam codebook as $$W_{i+1} = f(W_i, \theta_i); \quad (2)$$

such that the center of angular range of the union of the new beams in $W_{i+1}$ changes to $\theta_i$. This mapping in general is a multi-dimensional nonlinear transform. In the following, an example of a linear approximation of this nonlinear mapping is described.

The following linear transform can approximate the general nonlinear transform in (2) to rotate the beam codebooks with lower complexity and implementation burden. First, a one-dimensional (1D) array with unit-gain response at angular direction $\theta$ denoted as $a(\theta)$ is described. Extension to any arbitrary three-dimensional (3D) array will also be described. The parameter $a(\theta)$ is also sometimes referred to as the beam steering vector, and it can be provided for a variety of array designs and configurations. For example, the array response for a uniform linear array (ULA) is $$a(\theta) = \begin{bmatrix} 1 \\ e^{j\frac{2\pi}{\lambda} d \sin(\theta)} \\ \vdots \\ e^{j\frac{2\pi}{\lambda}(n_t - 1) d \sin(\theta)} \end{bmatrix} \quad (3)$$

where d is the inner-distance between adjacent antenna elements in the array and $\lambda$ is the wavelength of the carrier frequency. The length of $a(\theta)$ is equal to the number of antennas in the ULA, i.e. $n_t$. Next, a quantization of the support of the AoD is denoted as $S = [\theta_{q,1}, \theta_{q,2}, \ldots, \theta_{q,J}]$ where the parameter J denotes the number of sampled angles in the support of the AoD. Next, a matrix $A_S$ is formed using the steering vectors of the array at the quantized angles in the set S as $$A_S = [a(\theta_{q,1}), a(\theta_{q,2}), \ldots, a(\theta_{q,J})] \quad (4)$$

The set S can be fixed in advance, and it can be independent of the codebook. It may be large enough to cover a wider range of angles than the beam refinement codebook. In an example, the range is set to cover the full support of the initial beam codebook, i.e. $\theta_{q,1} = \theta_{min}$ and $\theta_{q,J} = \theta_{max}$. The number of quantized angles (i.e. J) affects the accuracy of the rotation of the codebook. In an example, this number may be in the order of the number of antennas to allow good performance.

The goal is to rotate the beam codebook $W_i$ such that the center of the angular range of the union of the new beams in $W_{i+1}$ changes to $\theta_i$. A rotation by $\theta_i$ in the AoD domain of any radiation pattern implies that the matrix of the quantized array response $A_S$ will be mapped to the following matrix $$A_S(\theta_i) = [a(\theta_{q,1} + \theta_i), a(\theta_{q,2} + \theta_i), \ldots, a(\theta_{q,J} + \theta_i)]. \quad (5)$$

Accordingly, such a linear transform R is searched for that maps the array response in $A_S$ to that in $A_S(\theta_i)$. This results in that the linear transformation R satisfies $$A_S(\theta_i) = R(\theta_i) A_S \quad (6)$$

A least squares solution to the above equation (6) is given by $$R(\theta_i) = A_S(\theta_i) A_S^H (A_S A_S^H)^{-1} \quad (7)$$

The matrix $R(\theta_i)$ depends only on the new desired angular direction $\theta_i$. Thus, the linear transformation of the codebook can be performed as $$W_{i+1} = R(\theta_i(w_{l_i})) W_i \quad (8)$$

and then normalize the columns of $W_{i+1}$ to ensure the power constraint at the transmitter Tx.

A variation of the above approach involves approximating $R(\theta_i)$ by its closest unitary matrix (in the Frobenius norm sense), which is given by $$\tilde{R} = UV^H \quad (9)$$

in which U and V are given by the SVD of $R(\theta_i) = USV^H$. The codebook is similarly transformed as $W_{i+1} = \tilde{R} W_i$. This way the power normalization can be automatically satisfied.

In this example, the beam scanning is done using the beam codebook $W_{i+1}$ for the time interval i+1. The data at the time interval i+1 is transmitted over beam $w_{l_i}$ of the beam codebook $W_i$.

In the example of FIG. 5B, beam index 2 is sent to the transmitter Tx in the coarse beam scanning session (step 522), so the network node device 100 rotates the refinement beam codebook to the center of a beam associated with the beam index 2, which is at the angle of 22.5 degrees, step 523. The rotated beam refinement codebook is then used for link tracking in the next beam scanning session, step 524. The network node device 100 may transmit the reference symbols over the refined beams in time, frequency or code domain. FIG. 5B illustrates an example of a rotated beam codebook where the receiver Rx with the help of 2 bits of feedback determines which beam is the most suitable for the data transmission. In this example, BSI with beam index 4 is fed back to the network node device 100 in the subsequent refined beam scanning session, step 525. For the next beam tracking of step 527, the beam refinement codebook is rotated towards the center of the beam labeled with index 4, step 526. In this way, the beam codebook can always be updated based on the last feedback, which ensures better link quality that supports high data rate transmissions.

Figure 7:
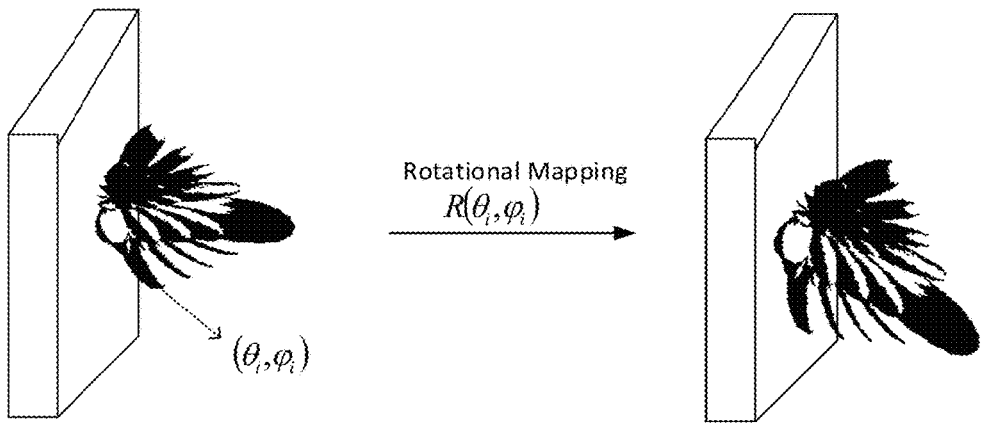
FIG. 7 is a diagram illustrating beam codebook adaptation for a three-dimensional antenna array.

The above example related to 1D arrays for the sake of simplicity. Extension to any arbitrary three-dimensional (3D) array will be described in the following. Diagram 700 of FIG. 7 illustrates the rotation with the proposed linear mapping for the 3D antenna array case. The array response vector for an arbitrary 3D array can be denoted as $$a(\theta, \varphi) = \begin{bmatrix} G_1(\theta, \varphi)e^{j\frac{2\pi}{\lambda}\beta \cdot r_1} \\ G_2(\theta, \varphi)e^{j\frac{2\pi}{\lambda}\beta \cdot r_2} \\ \vdots \\ G_{n_t-1}(\theta, \varphi)e^{j\frac{2\pi}{\lambda}\beta \cdot r_{n_t-1}} \\ G_{n_t}(\theta, \varphi)e^{j\frac{2\pi}{\lambda}\beta \cdot r_{n_t}} \end{bmatrix} \quad (10)$$

where $\theta$ and $\varphi$ are elevation and azimuth angles, $G_i(\theta, \varphi)$ is the gain of the antenna elements i in the direction $(\theta,\varphi)$, $\beta=[\sin(\theta)\cos(\varphi) \sin(\theta)\sin(\varphi) \cos(\theta)]$, $r_i=[x_i \ y_i \ z_i]$ are the three-dimensional coordinates of the antenna element i in the 3D array, and $\lambda$ is the wavelength of the carrier frequency. The angles $(\theta, \varphi)$ are polar angles in the Cartesian x-y-z coordinates. The linear rotation for any 3D antenna array can be now denoted as $$W_{i+1}=R(\theta_i(w_{l_i}),\varphi_i(w_{l_i}))W_i \quad (11)$$

in which $\theta_i(w_{l_i})$, $\phi_i(w_{l_i})$ are the elevation and azimuth angles corresponding to the feedback beam with index $l_i$ reported from the receiver Rx in the last beam scanning session and the matrix $R(\theta_i, \varphi_i)$ can be calculated as $$R(\theta_i,\varphi_i)=A_S(\theta_i,\varphi_i)A_S^H(A_SA_S^H)^{-1}, \quad (12)$$

where the matrices $A_S$ and $A_S(\theta_i, \varphi_i)$ are given by $$A_S=[a(\theta_{q,1},\varphi_{q,1}),a(\theta_{q,2},\varphi_{q,2}), \ldots ,a(\theta_{q,J},\varphi_{q,J})]$$

$$A_S(\theta_i,\varphi_i)=[a(\theta_{q,1}+\theta_i,\varphi_{q,1}+\varphi_i),a(\theta_{q,2}+\theta_i, \varphi_{q,2}+\varphi_i), \ldots ,a(\theta_{q,J}+\theta_i,\varphi_{q,J}+\varphi_i)] \quad (13)$$

and the parameter J is the number of quantized angle pairs $(\theta_{q,j}, \varphi_{q,j})$ in the support of elevation and azimuth angels of departures of the antenna array. The parameter q is a fixed number. Thus, the mapping in (11) can be used iteratively in each beam scanning session using the last feedback by updating the last used beam codebook. If $G_i(\theta,\varphi)=1$, $\varphi=0$ is set, and all elements on the x-axis are put with coordinates $r_i=[(i-1)d \ 0 \ 0]$, the general case simplifies to the uniform linear arrays (ULA) and the general mapping given in (12) reduces as well to that in (7) for ULA.

FIG. 1B is a block diagram that illustrates a client device 110. The client device 110 may be any of various types of devices used directly by an end user entity and capable of communication in a wireless network, such as user equipment (UE). Such devices include but are not limited to smartphones, tablet computers, smart watches, lap top computers, Internet-of-Things (IoT) devices etc. Although embodiments may be described in terms of a client device, it is by way of example and in no way a limitation.

According to an aspect, the client device 110 comprises a transceiver 111 and a processor or a processing unit 112 coupled to the transceiver 111, which may be used to implement the functionalities described below in more detail.

The processor 112 may include e.g. one or more of various processing devices, such as a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

The client device 110 may further comprise a memory (not illustrated in FIG. 1B) that is configured to store e.g. computer programs and the like. The memory may include one or more volatile memory devices, one or more non-volatile memory devices, and/or a combination of one or more volatile memory devices and non-volatile memory devices. For example, the memory may be embodied as magnetic storage devices (such as hard disk drives, floppy disks, magnetic tapes, etc.), optical magnetic storage devices, and semiconductor memories (such as mask ROM, PROM (programmable ROM), EPROM (erasable PROM), flash ROM, RAM (random access memory), etc.).

It is to be noted that the various parameters and pieces of data (including but not limited to beam configuration, angular arrangement, beam management procedure, "initial", "current", and "subsequent") used by the client device 110 are identical or at least functionally equivalent to those used by the network node device 100 so their descriptions are not repeated here in detail.

The transceiver 111 is configured to receive a current beam configuration for a beam scanning procedure. As described above, the current beam configuration comprises information on a set of beams in a current angular arrangement.

The processor 112 is configured to determine one or more link quality measurements to be performed on the set of beams in the current angular arrangement of the received current beam configuration. These link quality measurements may be related to e.g. received power for at least one beam, channel quality for at least one beam, signal-to-noise ratio (SNR) for at least one beam, signal-to-interference-plus-noise ratio (SINR) for at least one beam, and/or block error ratio (BLER) for at least one beam.

Based on the measured link quality exceeding or falling below a predetermined quality threshold, the processor 112 is further configured to determine a first indication that indicates an initial beam management procedure or a second indication that indicates a subsequent beam management procedure. In an example, the transceiver 112 is configured to transmit the first indication to start the initial beam management procedure in response to the measured link quality being below the predetermined quality threshold. In another example, the transceiver 112 is configured to transmit the second indication to start the subsequent beam management procedure in response to the measured link quality exceeding the predetermined quality threshold.

The transceiver 111 is further configured to transmit the determined first indication or the second indication. Further, the transceiver 111 may be configured to transmit the determined first indication or the second indication to a network node device, such as the network node device 100 of FIG. 1A.

In other words, since a beamformed signal is highly directional, it may be prone to blockage from physical objects. In order to avoid blockage, the broad or coarse beam acquisition can be repeated periodically for link recovery. One approach to do this is to use a regular sparse transmission of coarse beams followed by refined beams that manage fine link tracking through rotation, as discussed above. The coarse beams can be transmitted using synchronization signals, and the refined beams may again use client device or UE-specific reference signals, as further illustrated in diagram 900 of FIG. 9.

If the coarse beam management is performed using the synchronization signals, another potential impact is to the adjustment of the periodicity of the synchronization signals. For example, NR supports multiple values for the periodicity of the synchronization signals, so one example approach for balancing blockage probability versus the beam management overhead involves adjusting the period of the synchronization signals and using the rotated refined beam codebook in between. In other words, based on mobility, a longer synchronization signal period may be used with more often rotated refined beams.

Another approach (illustrated by diagram 1000 of FIG. 10) involves the network node device 100 performing the mechanism described below in a dynamic manner to avoid blockage, such that the refined codebook is updated (steps 1020, 1040) by the rotation based on the earlier feedback (step 1010) until the link quality measurements associated with the beams at the client device 110 drop below (step 1030) a given threshold value. When the link quality measurements fall below the threshold value, the client device 110 may transmit a signal to trigger P1 using the coarse beams (which are broader) to avoid an outage event. The link quality measurements may include e.g. Reference Signal Received Power (RSRP), Block Error Rate (BLER), or similar metrics (including SNR, SINR) that may quantify the quality of the link.

Figure 8:
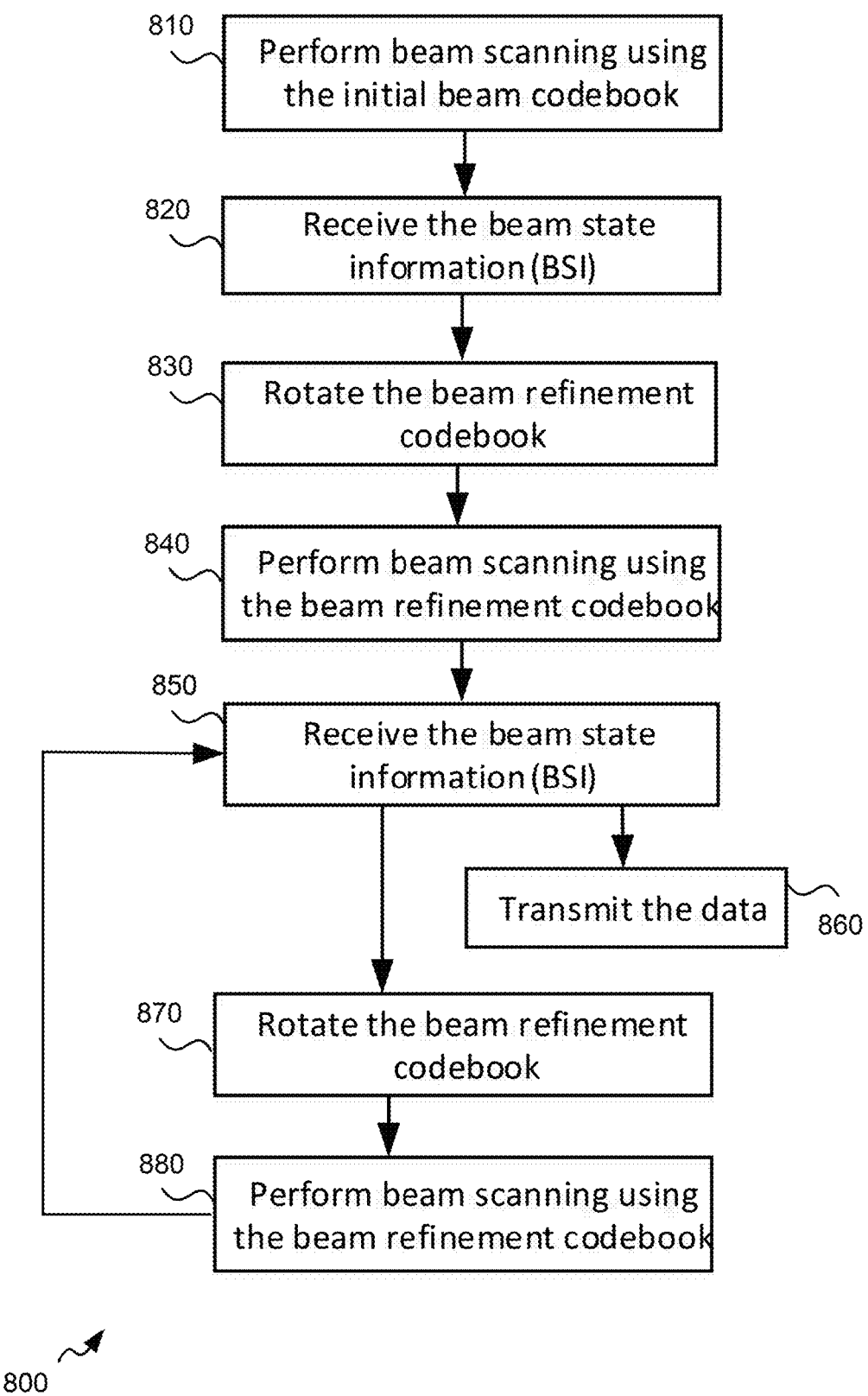
FIG. 8 is another flow diagram illustrating a method.
Figure 9:
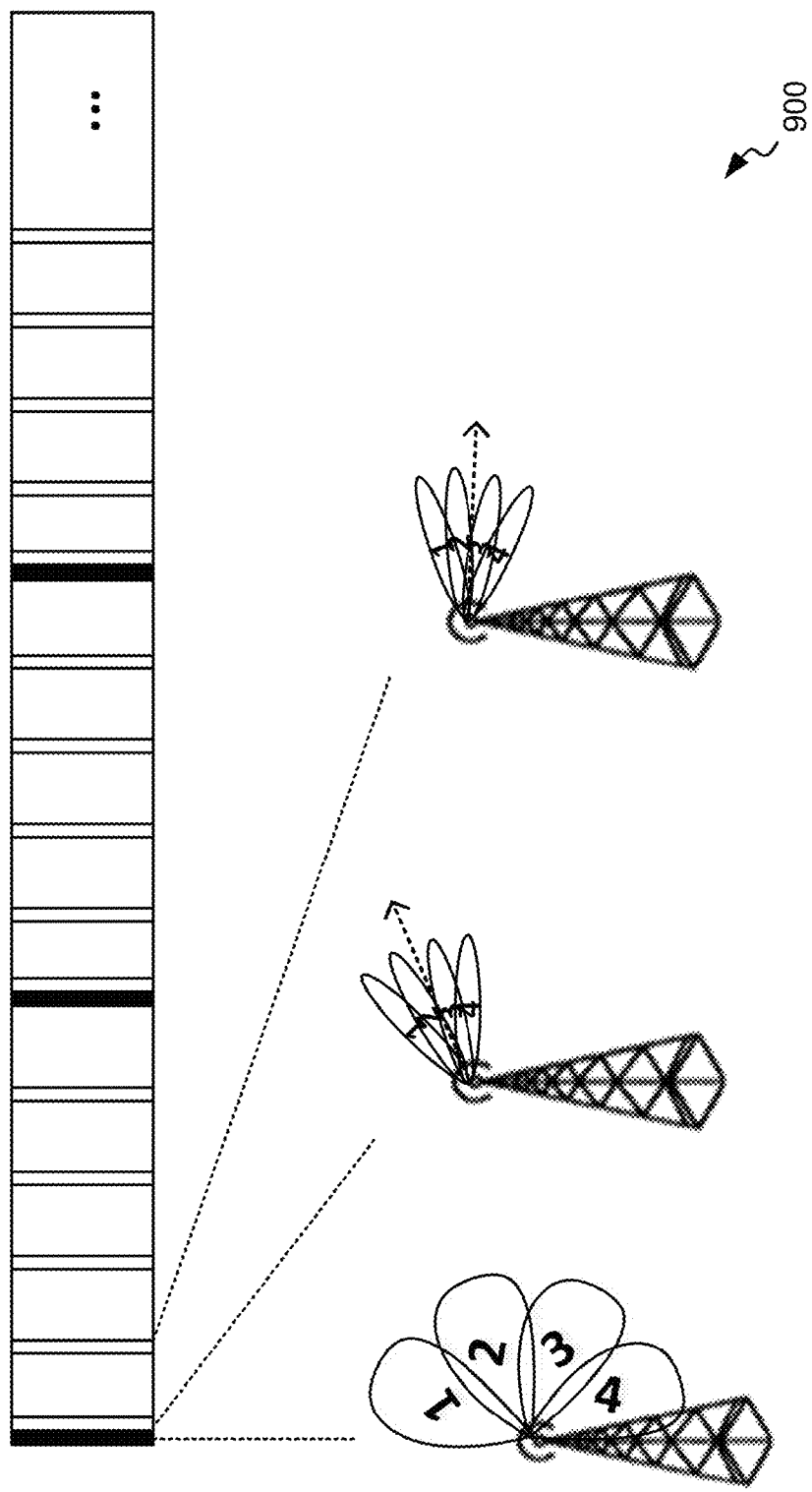
FIG. 9 is a diagram illustrating blockage avoidance.
Figure 10:
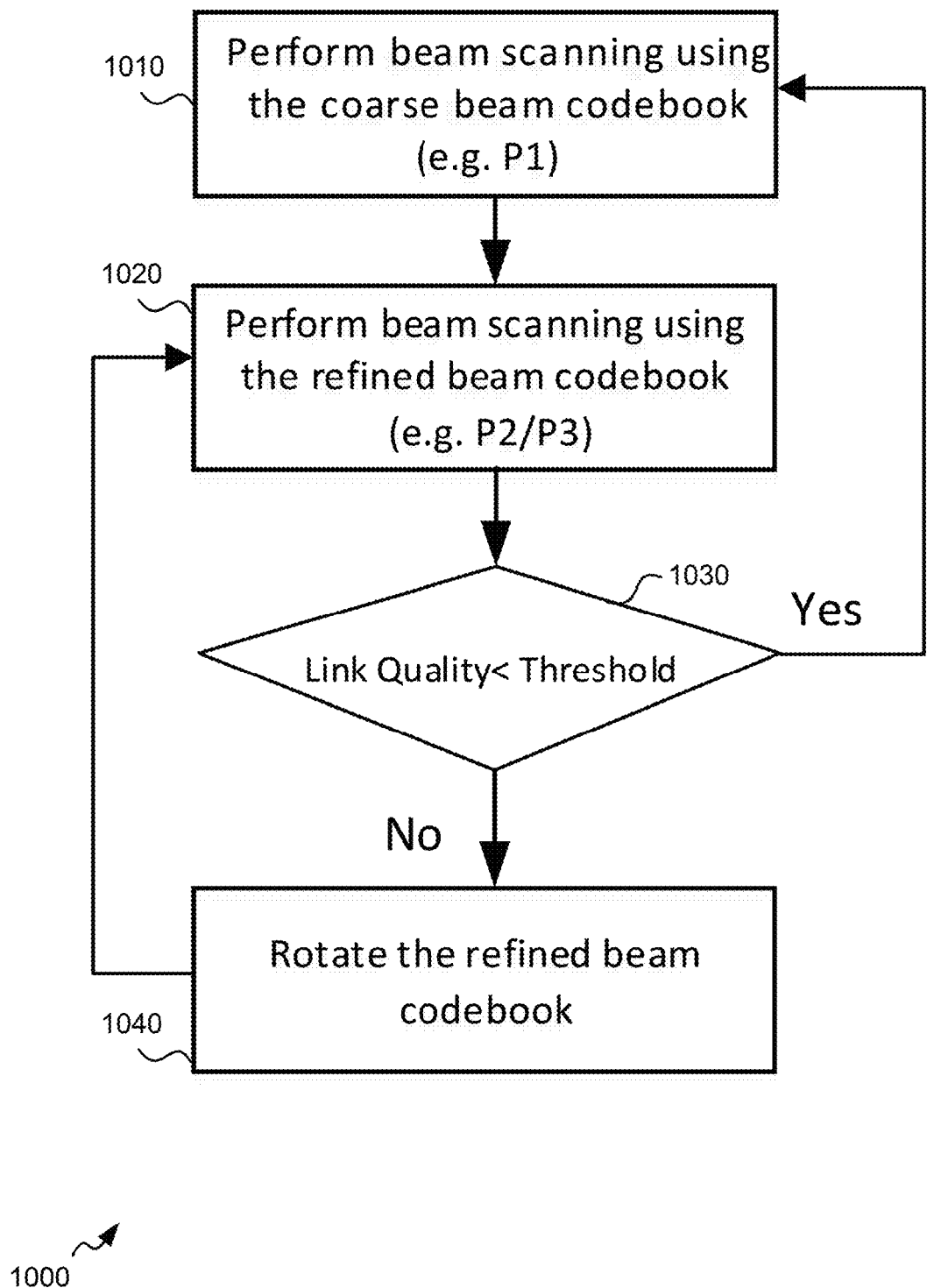
FIG. 10 is another flow diagram illustrating a method.

FIG. 8 shows a diagram 800 of an example method according to an embodiment.

The method 800 comprises transmitting, by a network node device, a current beam configuration for a beam scanning procedure, step 810. The current beam configuration comprises information on a set of beams in a current angular arrangement.

The method 800 further comprises receiving, at the network node device, feedback information related to the current beam configuration from a client device, step 820.

The method 800 further comprises determining, by the network node device, a preferred beam of the set of beams in the current angular arrangement based on the received feedback information, and determining a subsequent beam configuration for the beam scanning procedure, step 830. The subsequent beam configuration comprises information on one or more beams in a subsequent angular arrangement, and a mean direction of the subsequent angular arrangement corresponds with the direction of the determined preferred beam.

The method 800 further comprises transmitting, by the network node device, the subsequent beam configuration, step 840.

The method 800 further comprises receiving again feedback information related to the current beam configuration from a client device, step 850. At optional step 860, data may be transmitted utilizing the latest beam configuration.

The method 800 further comprises determining again a preferred beam of the set of beams in the current angular arrangement based on the received feedback information, and determining again a subsequent beam configuration for the beam scanning procedure, step 870.

The method 800 further comprises transmitting again the subsequent beam configuration, step 880.

The method 800 may be performed by the network node device 100. Further features of the method 800 directly result from the functionalities of the network node device 100. The method 800 can be performed by a computer program.

Figure 11:
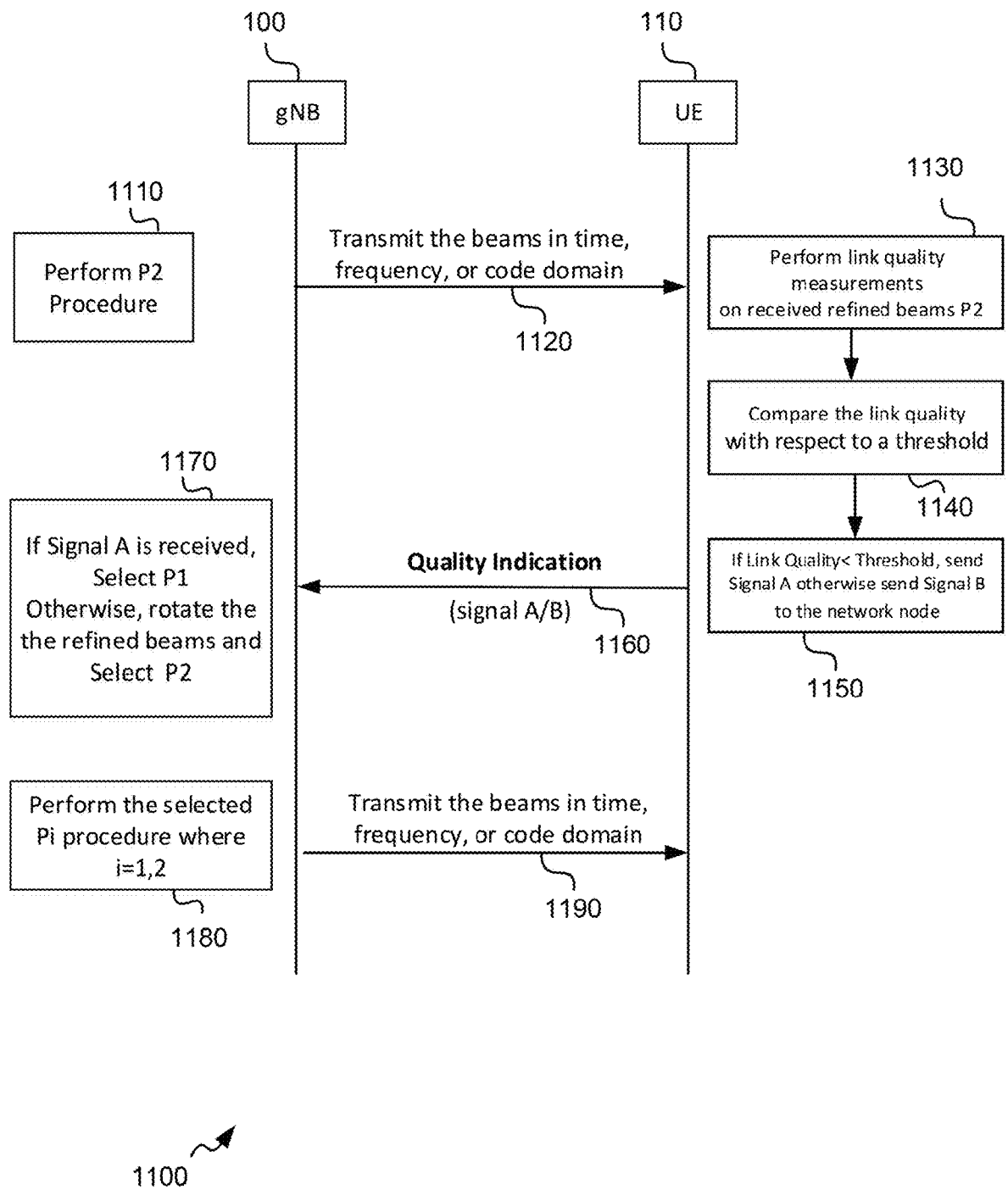
FIG. 11 is a signaling diagram illustrating a method.

FIG. 11 shows a diagram 1100 of another example of a method according to an embodiment.

The method 1100 comprises performing a P2 procedure, as discussed above in more detail, step 1110.

The method 1100 further comprises receiving, at the client device 110, a current beam configuration for a beam scanning procedure, step 1120. The current beam configuration comprises information on a set of beams in a current angular arrangement.

The method 1100 further comprises determining, by the client device 110, at least one link quality measurement to be performed on the set of beams in the current angular arrangement of the received current beam configuration, step 1130.

The method 1100 further comprises comparing the measured link quality with a predetermined quality threshold, step 1140.

The method 1100 further comprises determining, based on the measured link quality exceeding or falling below the predetermined quality threshold, a first indication indicating an initial beam management procedure or a second indication indicating a subsequent beam management procedure, step 1150. The first indication (signal A in FIG. 11) is used to start the initial beam management procedure in response to the measured link quality being below the predetermined quality threshold, and the second indication (signal B in FIG. 11) is used to start the subsequent beam management procedure in response to the measured link quality exceeding the predetermined quality threshold.

The method 1100 further comprises transmitting, by the client device 110, the determined first indication or the second indication, step 1160.

The method 1100 further comprises step 1170, in which if the link quality measurement (e.g. BLER/RSRP/SNR/SINR) falls below the threshold, the network node device 100 upon receiving the signal A selects P1 with coarse beams, performs the selected P1 procedure at step 1180, and transmits the associated beams at step 1190. Otherwise, the client device 110 transmits signal B at step 1160 and the network node device 100 upon receiving this signal selects P2 with rotated refined beams at step 1170, performs the selected P2 procedure at step 1180, and transmits the associated rotated refined beams at step 1190 to the client device 110.

The method 1100 may be performed by the network node device 100 and the client device 110. Further features of the method 1100 directly result from the functionalities of the network node device 100 and the client device 110. The method 1100 can be performed by one or more computer programs.

Figure 12:
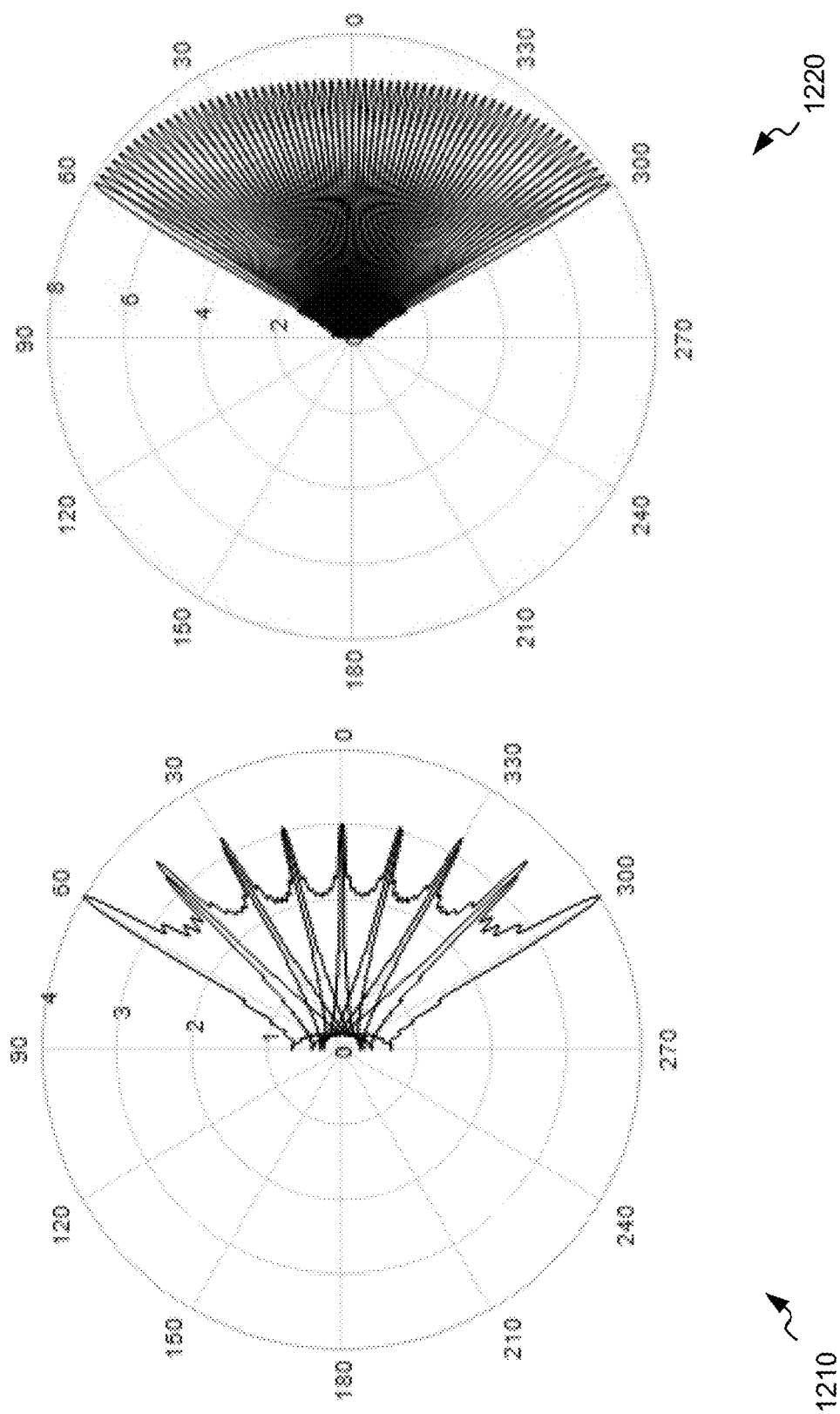
FIG. 12 is a diagram illustrating radiation patterns.
Figure 14A:
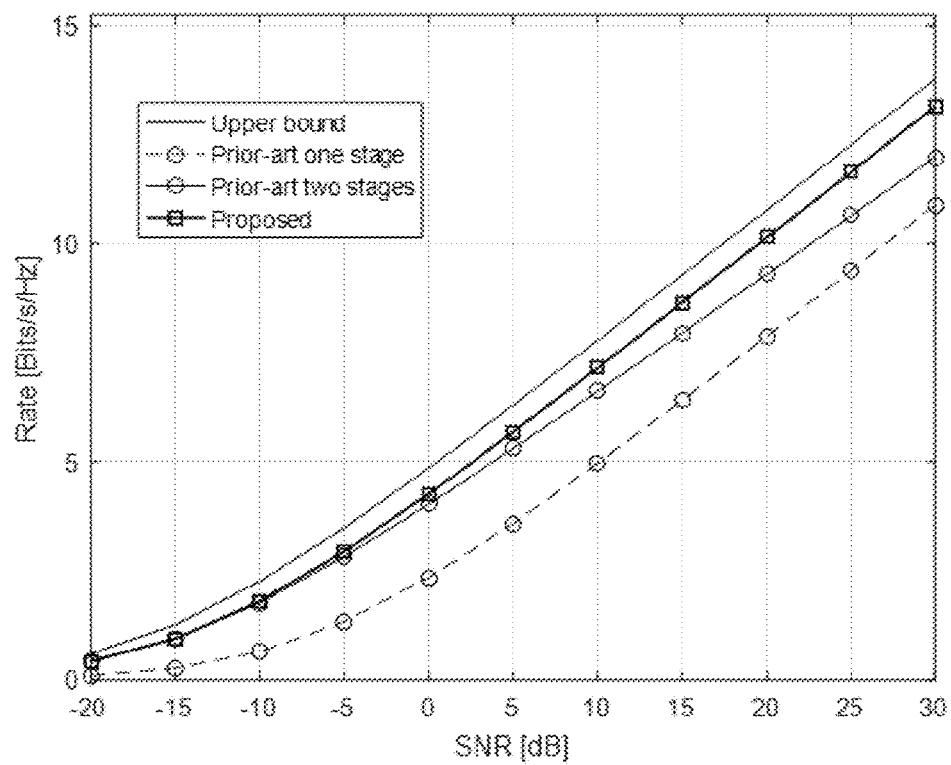
FIG. 14A is a diagram illustrating achievable rates with noiseless pilot transmission.
Figure 14B:
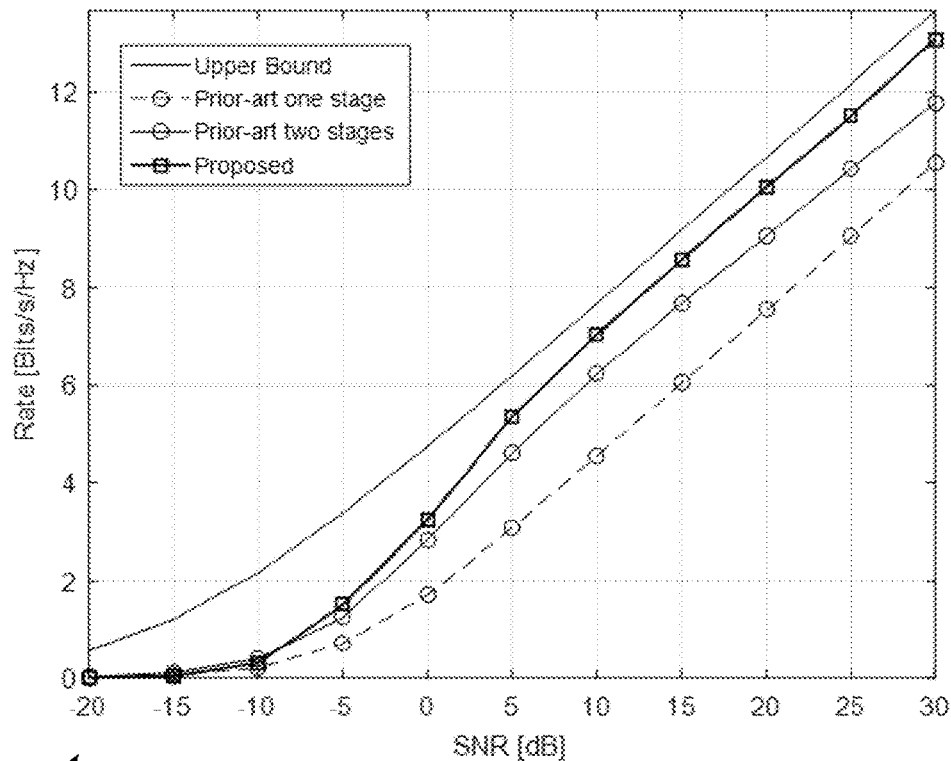
FIG. 14B is another diagram illustrating achievable rates with noisy pilot transmission.

The following compares the transmission rate achievable using the embodiments of the present invention with that of prior art. FIGS. 14A and 14B plot the transmission rate that is achievable using the embodiments of the present invention. A network node device 100 equipped with a uniform linear antenna array with $n_t=64$ antenna elements and half-wavelength antenna spacing is used as an example. The client device 110 is equipped with a single antenna element. As a baseline for the comparison, a two-stage codebook is considered. The first stage uses a coarse codebook with eight beams covering a sector of 120°. The second stage includes a refinement codebook of eight fine beams per one coarse beam, which amounts to a total of 64 narrow beams. The radiation patterns of the beam codebooks for the two-stage link tracking are shown in FIG. 12. Diagrams 1210 and 1220 illustrate the radiation patterns for the first stage coarse beam codebook and the second stage fine beam codebook, respectively.

The propagation channel is modeled as a Rayleigh-faded single-path channel $h_i = \alpha_i a(\phi_i)$ where the attenuation $\alpha_i \sim CN(0,1)$ follows normal distribution and $a(\phi_i)$ is an ULA antenna response as given in (3). A block-fading channel model is used where the attenuation $\alpha_i$ and the AoD $\phi_i$ are constant during a single transmission slot i, but vary independently over different slots. The AoD of the channel is assumed to correlate in time and be given by $\phi_{i+1} = \phi_i + \omega_i$ where $\omega_i$ is a zero-mean random variable which is uniformly distributed on a support $$\left[-\frac{\omega_{range}}{2}, \frac{\omega_{range}}{2}\right]$$

with $\omega_{range} = 7.5°$, i.e. half the range of a coarse beam in diagram 1210. In this model, if the new angle goes beyond the boundaries it is truncated back so that it stays in the angular support.

In transmission slot i, the transmitter first performs the beam scanning procedure by sending different beamformed pilot signal on orthogonal resources. The receiver collects the transmitted pilots (indexed by k)

$$r_{ik} = h_i^H w_{ik} x_p + n_{ik} \qquad (14)$$

where $x_p$ is a pilot symbol with energy $E_p$, and $n_{ik} \sim CN(0, N_0)$ is the receiver noise with variance $N_0$, and $w_{ik}$ are the beamforming vectors to generate the kth beam in slot i. The receiver is assumed to select the best beam from the scanning procedure as $$w_{l_i} = \underset{k}{\mathrm{argmax}} |r_{ik}| \qquad (15)$$

the index of which is then fed back to the transmitter and used for data transmission. During the transmission slot i, a sequence of data symbols is transmitted which is received as $$y = h_i^H w_{l_i} x_d + n \qquad (16)$$

where $x_d$ is assumed to be unit energy data symbol and $n \sim CN(0, N_0)$. The corresponding maximum achievable rate with Gaussian signaling is $$R = \frac{N_s - N_p}{N_s} \mathbb{E}_i \left[ \log_2 \left( 1 + \frac{|h_i^H w_{l_i}|^2}{N_0} \right) \right] \qquad (17)$$

where $N_s$ is the total amount of resources per slot and $N_p$ is the number of resources used for pilot transmission. The achievable rate is limited by the number of pilot resources in the pre-log factor as well as the quality of the selected beam $w_{l_i}$ in the scanning procedure. The selected beam also depends on the quality of the pilot transmission which has an operating SNR. A similar resource allocation is used here as that in LTE numerology where a resource block (i.e. slot) is made of seven orthogonal frequency-division multiplexing (OFDM) symbols with 12 subcarriers, i.e. $N_s = 84$ resource elements per transmission slot.

The following four schemes are illustrated in the figures:
a) The embodiments of the present invention: The transmission frame is set in accordance with the example of FIG. 4. The codebooks are rotated and updated according to the iterative equation in (8) using the rotation mapping in (7). The number of beams is set to eight for the first initial step, and the number of refinements beams are also set to eight for the follow-up steps. $N_p = 8$ in each slot is assumed for beam scanning;
b) Baseline scheme with one-stage scanning: Only one stage is used, and the transmission frame is set in accordance with FIG. 2A. This baseline uses the coarse codebook of diagram 1210. Again, $N_p = 8$ in each transmission slot is assumed for beam scanning;
c) Baseline scheme with two-stage scanning: Two stages are used, and the transmission frame is set in accordance with FIG. 2B. Eights beams are used at each stages as illustrated in FIG. 12. $N_p = 16$ in each transmission slot is assumed for beam scanning, where 8 resources are used for the transmission of the coarse beams and 8 resources are used for the transmission of fine beams; and
d) Upper Bound: An infinite number of beams are considered. This is similar to perfect channel state information (CSI) with optimal beamforming. This represents an upper bound on any training and feedback scheme. It is illustrated with the minimum overhead among the different approaches, i.e. $N_p = 8$.

Figure 13:
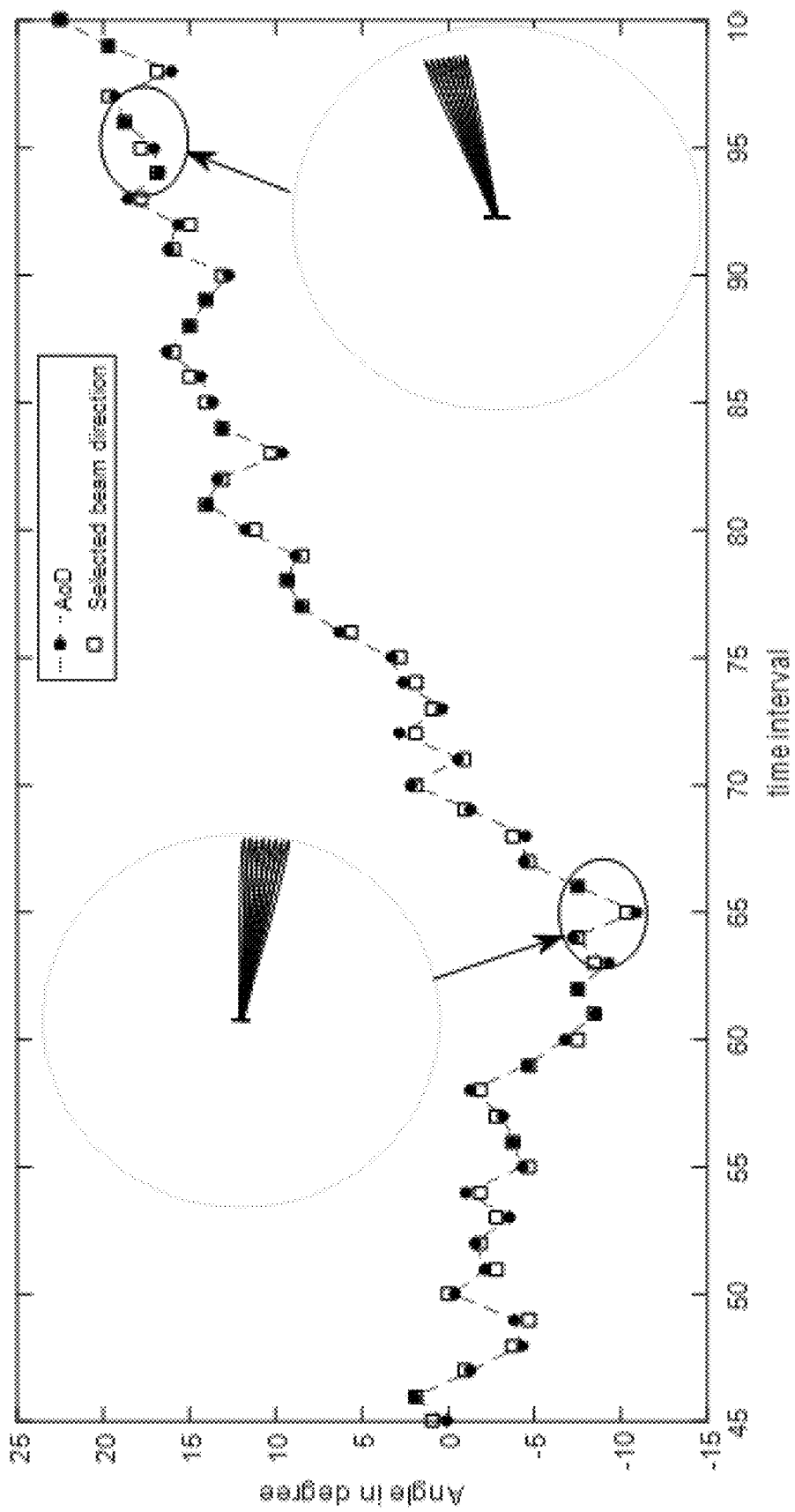
FIG. 13 is a diagram illustrating tracked beam direction.

First, channel fluctuation and the beam tracking procedure are illustrated with diagram 1300 of FIG. 13 which displays the AoD of the channel at each transmission slot as well as the main direction of the selected beam. The beam selection is assumed here for $SNR_p \gg 1$ to see only the effect of the rotated beam design. To further illustrate embodiments of the invention, the rotating codebooks are also displayed for transmission slots 65 and 95. It can be seen that the rotational codebooks are capable of the channel tracking.

The achievable sum rate with noise-free pilot transmission is shown in diagram 1410 of FIG. 14A for 1000 consecutive slots. In this scenario, the disclosure uses the same amount of feedback as in the one-stage baseline in FIG. 2A, and half the feedback of the two-stage baseline in FIG. 2B. In addition to the reduction of the feedback overhead, it can be observed that the disclosure performs better than the two baselines as it simultaneously consumes the same number of pilot signaling as that of the one-stage baseline. The gain using the disclosure compared to the two-stage baseline at 10 bps/Hz is nearly 3 dB.

Next, a scenario with noisy pilot transmission is considered. The achievable sum rate with noisy pilot transmission is shown in FIG. 14B for 1000 consecutive slots. The power of the pilot and data are equal in this example. For the embodiment of the invention, its curve in FIG. 14B can be obtained by additionally averaging the performance over 20 initialization routines. In this scenario, the disclosure provides the best performance, with SNR ranging from −10 dB to 30 dB. The gain using the disclosure compared with the two-stage baseline at 10 bps/Hz is more than 4 dB. Furthermore, the disclosed rotational codebook approach has half the feedback overhead of that of the two-stage beamforming. Thus, the disclosure provides gains both in spectral efficiency of the downlink transmission as well as in the feedback overhead.

Figure 15:
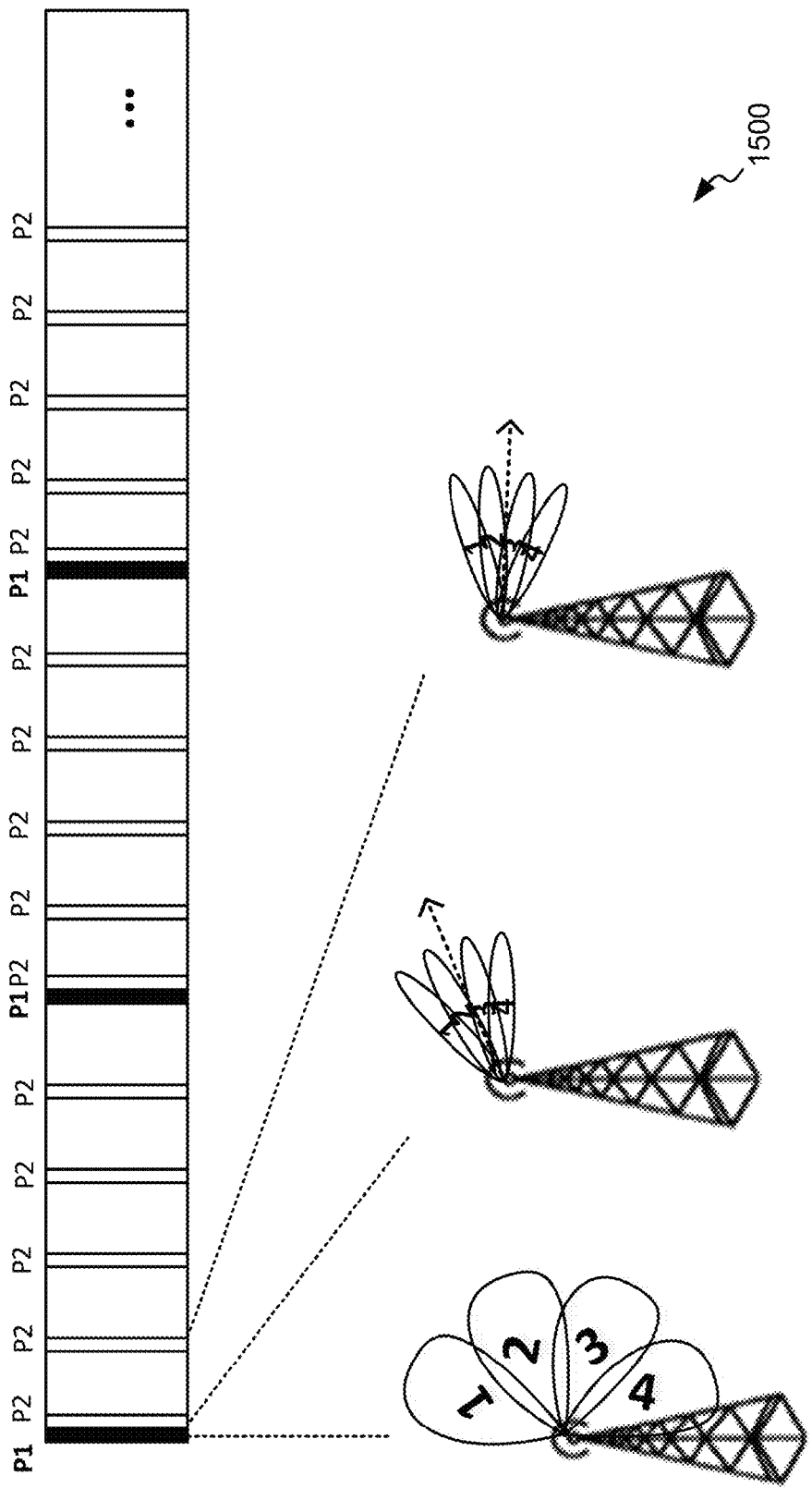
FIG. 15 is another diagram illustrating a transmission frame.
Figure 16:
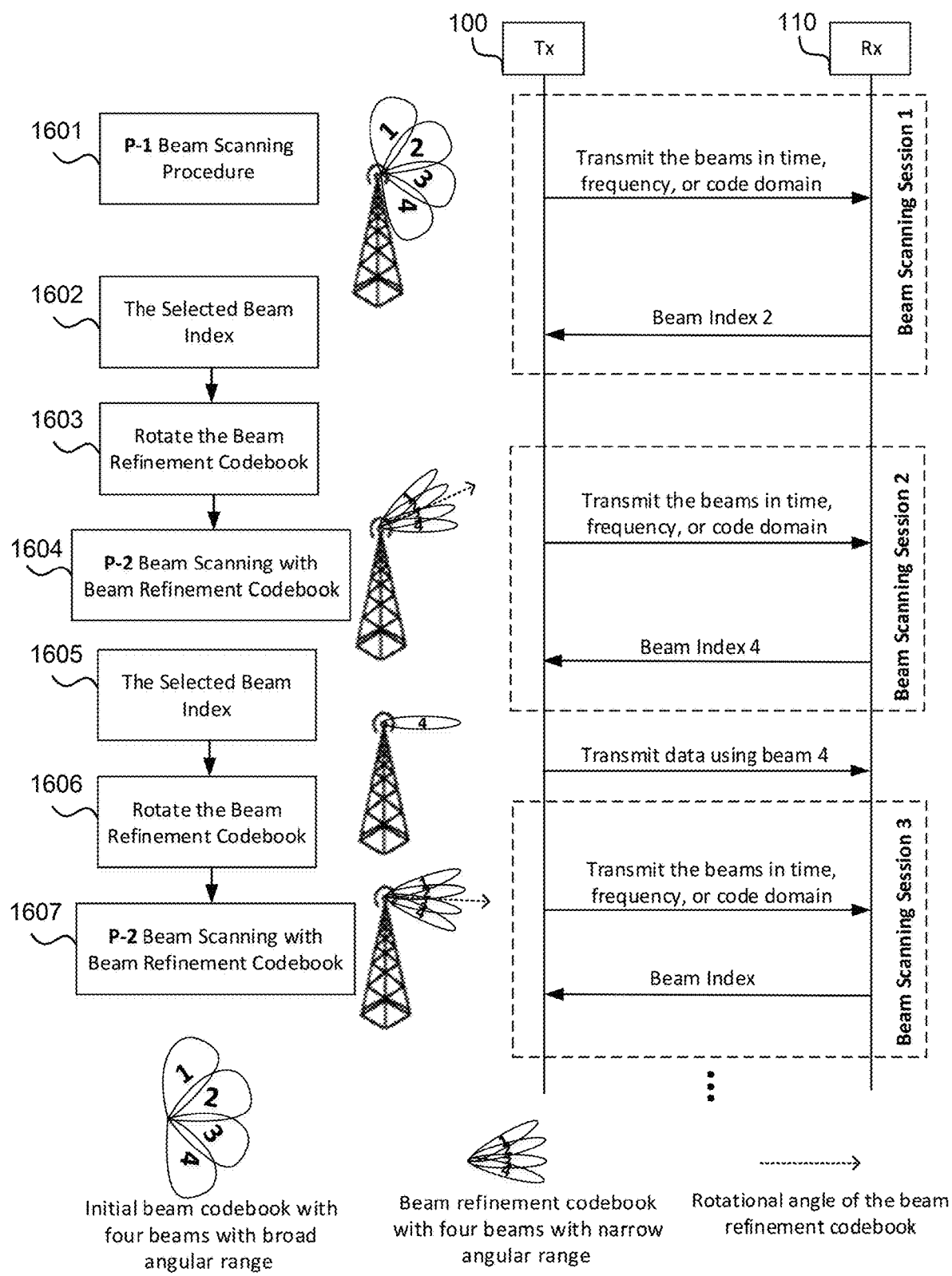
FIG. 16 is another diagram illustrating signaling operations.

Diagram 1500 of FIG. 15 illustrates an example of a transmission frame for P1 and P2 where the first P2 is updated based on P1 and the following P2 is updated based on the earlier P2. This is further illustrates in the example of diagram 1600 of FIG. 16 in which the update is performed by the rotation of the beams based on the latest beam report. The steps 1601 to 1607 correspond generally with steps 521 to 527 of FIG. 5B so their details are not repeated here.

The functionality described herein can be performed, at least in part, by one or more computer program product components such as software components. According to an embodiment, the client device 110 and/or network node device 100 comprise a processor configured by the program code when executed to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and Graphics Processing Units (GPUs).

Any range or device value given herein may be extended or altered without losing the effect sought. Also any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the embodiments described above may be combined with aspects of any of the other embodiments described to form further embodiments without losing the effect sought.

The term 'comprising' is used herein to mean including the method, blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A client device, comprising:
a processor; and
a transceiver-configured to, in coordination with the processor, receive a current beam configuration for a beam scanning procedure,
wherein the processor is configured to:
utilize a linear transformation:

$$W_{subsequent}=R(\theta_i,\varphi_i)W_{current}$$

to determine a subsequent beam management codebook $W_{subsequent}$ by multiplying a matrix R with a current beam management codebook $W_{current}$, wherein the matrix R is determined by an elevation angle $\theta_i$, and an azimuth angle $\varphi_i$;
determine at least one link quality measurement to be performed on a set of beams in a current angular arrangement of the received current beam configuration; and
determine, based on the determined at least one link quality measurement exceeding or falling below a predetermined quality threshold, a first indication indicating an initial beam management procedure or a second indication indicating a subsequent beam management procedure, and
wherein the transceiver is further configured to transmit the determined first indication or second indication.

2. The client device-according to claim 1, wherein the transceiver is further configured to transmit the first indication to start the initial beam management procedure in response to the determined at least one link quality measurement being below the predetermined quality threshold.

3. The client device-according to claim 1, wherein the transceiver is further configured to transmit the second indication to start the subsequent beam management procedure in response to the determined at least one link quality measurement exceeding the predetermined quality threshold.

4. The client device-according to claim 1, wherein an initial beam configuration is used in the initial beam management procedure, and a subsequent beam configuration is used in the subsequent beam management procedure, and wherein the initial beam configuration comprises broader beams than any subsequent beam configuration.

5. A method, comprising:
receiving, at a client device, a current beam configuration for a beam scanning procedure;
determining,-utilizing a linear transformation:

$$W_{subsequent}=R(\theta_i,\varphi_i)W_{current}$$

a subsequent beam management codebook $W_{subsequent}$ by multiplying a matrix R with a current beam management codebook $W_{current}$, wherein the matrix R is determined by an elevation angle $\theta_i$ and an azimuth angle $\varphi_i$;
determining, by the client device, at least one link quality measurement to be performed on a set of beams in a current angular arrangement of the received current beam configuration; and
determining, based on the determined at least one link quality measurement exceeding or falling below a predetermined quality threshold, a first indication indicating an initial beam management procedure or a second indication indicating a subsequent beam management procedure; and
transmitting, by the client device, the determined first indication or second indication.

6. A non-transitory computer readable medium comprising a program code that when executed by a processor, causes the processor to execute steps comprising:

receiving, at a client device, a current beam configuration for a beam scanning procedure;
determining, utilizing a linear transformation:

$$W_{subsequent} = R(\theta_i, \varphi_i) W_{current}$$

a subsequent beam management codebook $W_{subsequent}$ by multiplying a matrix R with a current beam management codebook $W_{current}$, wherein the matrix R is determined by an elevation angle $\theta_i$ and an azimuth angle $\varphi_i$;
determining, by the client device, at least one link quality measurement to be performed on a set of beams in a current angular arrangement of the received current beam configuration; and
determining, based on the determined at least one link quality measurement exceeding or falling below a predetermined quality threshold, a first indication indicating an initial beam management procedure or a second indication indicating a subsequent beam management procedure; and
transmitting, by the client device, the determined first indication or the second indication.

* * * * *